(12) United States Patent
Tam

(10) Patent No.: US 7,155,528 B2
(45) Date of Patent: Dec. 26, 2006

(54) SIMPLE SUPPLEMENTARY SERVICE PROTOCOL FOR H.323 SYSTEMS

(75) Inventor: Terry Tam, Kanata (CA)

(73) Assignee: Mitel Corporation, Kanata (CA)

( * ) Notice: Subject to any disclaimer, the term of this patent is extended or adjusted under 35 U.S.C. 154(b) by 729 days.

(21) Appl. No.: 09/761,136

(22) Filed: Jan. 16, 2001

(65) Prior Publication Data

US 2001/0056496 A1 Dec. 27, 2001

(30) Foreign Application Priority Data

Jan. 17, 2000 (GB) ................................ 0001035.5

(51) Int. Cl.
*G06F 15/16* (2006.01)
*H04L 12/66* (2006.01)
*H04M 3/00* (2006.01)
(52) U.S. Cl. ..................... 709/230; 370/352; 379/283
(58) Field of Classification Search ................ 709/230; 370/352, 466, 469, 207.01, 207.06, 207.07, 370/207.08, 201.01; 379/283, 900
See application file for complete search history.

(56) References Cited

U.S. PATENT DOCUMENTS

| | | | | | |
|---|---|---|---|---|---|
| 6,118,763 | A  * | 9/2000 | Trumbull | ............... | 370/231 |
| 6,430,176 | B1 * | 8/2002 | Christie, IV | ............... | 370/355 |
| 6,614,784 | B1 * | 9/2003 | Glitho et al. | ............... | 370/352 |
| 6,621,814 | B1 * | 9/2003 | Korpi et al. | ............... | 370/352 |
| 6,636,508 | B1 * | 10/2003 | Li et al. | ............... | 370/389 |
| 6,693,874 | B1 * | 2/2004 | Shaffer et al. | ............... | 370/217 |
| 6,738,343 | B1 * | 5/2004 | Shaffer et al. | ............... | 370/216 |

FOREIGN PATENT DOCUMENTS

| | | |
|---|---|---|
| GB | 2343584 | 5/2000 |
| WO | 9410813 | 5/1994 |

OTHER PUBLICATIONS

Kumar et al, "Supplementary Services in the H.323 IP Multimedia", Communications Magazine, IEEE, vol. 37, Issue: 7, Ju 1999, pp. 118-125.*

* cited by examiner

*Primary Examiner*—William Vaughn
*Assistant Examiner*—Yemane M. Gerezgiher
(74) *Attorney, Agent, or Firm*—F. Chau & Associates, LLC

(57) ABSTRACT

A simple supplementary service protocol (SSSP) is provided for implementing functionally based supplementary services using the H.323 standard. According to the preferred embodiment, a generic and expandable protocol is provided for passing supplementary services information between H.323 entities for the provision of over twenty classes of functionally based supplementary services. The protocol of the present invention is relatively lightweight (i.e. not code intensive) compared to H.450 since it does not rely on ASN.1 encoding. In addition, the mixture of functional and stimulus protocol concepts in the design of the inventive protocol results in robust functional characteristics and implementation capability using only lightweight Endpoints.

10 Claims, 27 Drawing Sheets

SSSP TRANSPORT

SIMPLE SUPPLEMENTARY SERVICE PROTOCOL FOR H.323 SYSTEMS

FIELD OF THE INVENTION

The present invention relates in general to network-based voice communications, and more particularly to a method of supporting functionally based supplementary services implemented using H.323 protocol.

BACKGROUND OF THE INVENTION

H.323 is a well known standard for multi-media communication. This standard governs communications between terminals and other entities over a packet switched network. A person of ordinary skill in the art and who is familiar with the H.323 standard will understand the elements of establishing third party call control via a Gatekeeper. Briefly, upon powering up, a H.323 endpoint (desktop) implements a discovery process for determining which Gatekeeper to register with. This can be effected in a number of ways, such as by multicasting a message which identifies the endpoint (i.e. the GRQ message) to a predetermined multicast address. The assigned Gatekeeper then responds (i.e. the GCF/GRJ message) with its RAS channel address (i.e. IP address). Before attempting to place a call, the endpoint must register with the Gatekeeper (i.e. the RRQ message) by advising it of its transport address and any aliases (discussed below). Registration is then confirmed by the Gatekeeper (i.e. via the RCF/RRJ message). Actual call signaling takes place over an established channel between two H.323 endpoints using Q.931 messages. For third party (i.e. Gatekeeper) call control, the originating endpoint sends a H.225 Admission Request (ARQ) to the Gatekeeper over the previously established RAS channel. The Gatekeeper responds with an ACF message which specifies the call signaling transport address to use for the call setup. The originating endpoint then transmits a Setup message to the Gatekeeper which, in turn, sends a Setup message to the destination endpoint. The destination endpoint then sends an admission request (ARQ) to the Gatekeeper and receives an acknowledgment (ACF) therefrom. Finally, a Connect message is sent from the destination endpoint to the Gatekeeper which contains the address of the originating endpoint for H.425 control messages to the originating endpoint.

The inventor has recognized the desirability of adapting the H.323 standard to voice communications such as traditionally implemented via a PBX. However, the H.323 umbrella protocol standard only provides a limited set of recommendations in terms of supporting functionally based supplementary services between a Gatekeeper (GK) and an Endpoint (EP), due to the relative newness of the standard. Thus, H.323 suffers from limitations in providing a full range of PBX like functionally based supplementary services. The use of a functionally based supplementary service protocol requires a substantial amount of intelligence and knowledge of state within the Endpoint, which tends to make an Endpoint code heavy.

The H.323 recommendation refers to the H.450 recommendation as the primary method for functionally based supplementary service signaling in the H.323 domain. The H.450 recommendation is new, with support for only eight supplementary services (as of Oct. 99), and expanding at a current rate of only three supplementary services per year. Furthermore, the H.450 protocol is a cumbersome protocol since it is ASN.1 based.

Another available method of supplementary services signaling is through the use of "DTMF signaling". This is similar to the use of feature access code signaling methods seen in traditional telephony. However, DTMF signaling is also not an ideal method for providing supplementary services since it usually requires a user to remember a complicated set of access codes and is therefore error prone.

SUMMARY OF THE INVENTION

According to the present invention, a simple supplementary service protocol (SSSP) is provided for implementing functionally based supplementary services using the H.323 standard. According to the preferred embodiment, a generic and expandable protocol is provided for passing supplementary services information between H.323 entities for the provision of over twenty classes of functionally based supplementary services. The protocol of the present invention is relatively lightweight (i.e. not code intensive) compared to H.450 since it does not rely on ASN.1 encoding. In addition, the mixture of functional and stimulus protocol concepts in the design of the inventive protocol results in robust functional characteristics and implementation capability using only lightweight Endpoints.

According to another aspect of the invention, a user interface is provided at an Endpoint for the purpose of displaying call and feature information relating to a SSSP enabled device, without the requirement of an elaborate state machine.

BRIEF DESCRIPTION OF THE DRAWINGS

An embodiment of the invention is described below with reference to the accompanying drawings, in which.

DETAILED DESCRIPTION OF THE PREFERRED EMBODIMENT

Figure 1:
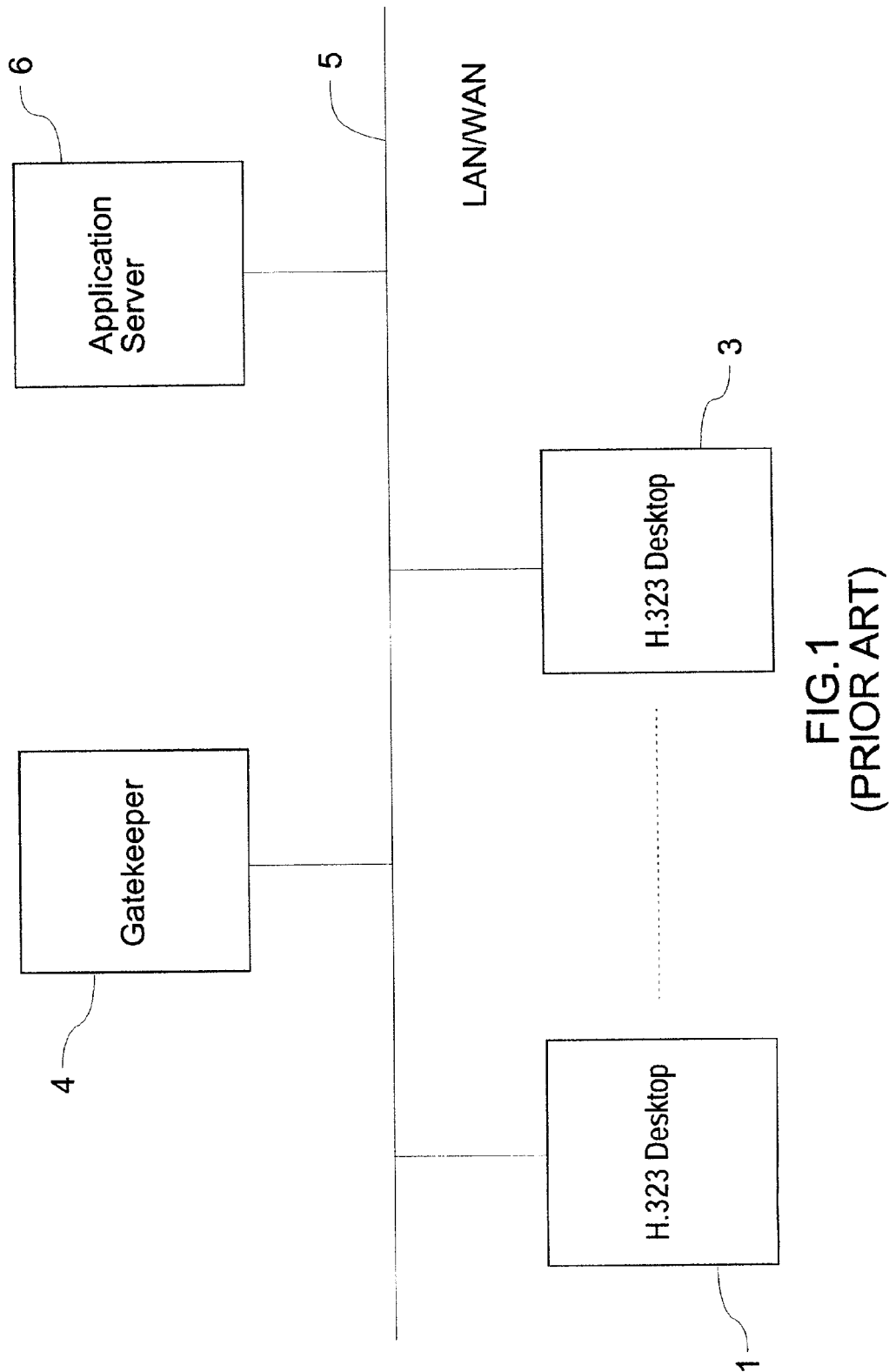
FIG. 1 is a schematic representation of a network-based communication system implemented according to the H.323 standard, including a Gatekeeper, an Application Server and a plurality of H.323 devices.

FIG. 1 shows a typical H.323 system, with H.323 endpoints 1 to 3 and a Gatekeeper 4 connected to a LAN/WAN 5, according to a fully-routed H.323 Model. An Application Server 6 is also connected to the LAN/WAN 5, which uses TAPI, TSAPI or JTAPI to control endpoints for telephony applications. The Simple Supplementary Services Protocol (SSSP) of the present invention is a generic communication scheme between a server entity (such as H.323 Gatekeeper 4) and an associated Endpoint 1 (such as a H.323 Terminal) or between Endpoints 1. The SSSP provides a method of call signaling and control signaling that can be carried over existing protocols that support "user-to-user" like information (such as H.323 or ISDN). The following portions of the disclosure describe an encoding method according to the present invention, primitive definition, expandability rules, and the preferred transport method for SSSP. This is followed by illustrations of SSSP as a feature protocol between H.323 Gatekeeper 4 and H.323 Endpoint 1.

A generalized method of Alpha Numeric String Encoding and Dual Tone Multiple Frequency (DTMF) String Encoding for a SSSP Protocol Data Unit (PDU) is provided, as set forth below. Alpha Numeric is the preferred method of encoding when used in H.323 systems. The DTMF String Encoding method is restricted to the traditional DTMF character set. As such, it allows SSSP to be ported to non-H.323 communication systems with ease.

General Encoding Terminology

AlphaNumericType ::= sequence of characters of set (A, B, C, D, E, F, G, H, I, J, K, L, M, N, O, P, Q, R, S, T, U, V, W, X, Y, Z, 0, 1, 2, 3, 4, 5, 6, 7, 8, 9}

DirectoryNumberType ::= sequence of characters of set {0,1,2,3,4,5,6,7,8,9,#,*,!}, NumberType ::= sequence of characters of set {0,1,2,3,4,5,6,7,8,9}

MacAddressType ::= MacParm '*' MacParam '*' MacParam '*' MacParam '*' MacParam '*' MacParam Where MacParam ::= NumberType (MaxSize(3))

Alpha Numeric String Encoding

SSSPTag ::= 'SP'

PrimitiveName ::= AlphaNumbericType

ParmeterSeperator ::= ','

PDUType ::= 'T' | 'Q' | 'R' | 'C' | 'E'

Parameters ::= DirectoryNumberType | MacAddressType | NumberType

ParameterExtenstions ::= ParameterSeperator Parameters

EndTag ::= NULL (0x00 for ASCII and 0x0000 for Unicode)

PDUName ::= SSSPTag ParameterSeperator PrimitiveName PDUType

SSSP PDU(String Encoding) ::=
 PDUName ParameterExtensions EndTag.

In the foregoing encoding method, the following restrictions apply:

SSSPTag is limited to 2 characters wide

PrimitiveName is limited to 3 characters wide. The first 2 characters are unique for each class of supplementary service. For example, all call forwarding features begin with CF and the agent login/logout feature begins with AL.

PDUType is limited to 1 character wide, wherein 'I'=Indication; 'Q'=Request; 'R'=Response; 'C'=Command; 'E'=Error The SSSP PDU (String Encoding) is limited to 16384 characters wide Thus, for example, a call forward busy indication containing the forwarded destination directory number is formatted as follows:

PDUName ::= SP,CFBI

ParameterExtensions ::= DirectoryNumber

SSSP PDU ::= SP,CFBI,DirectoryNumber

DTMF String Encoding

FeatureTag ::= 'AC'

FeatureCode ::= NumberType

ParameterSeperator ::= '*'

Params ::= NumberType

ParamExten ::= ParameterSeperator Params

ACEndTag ::= NULL (0x00 for ASCII and 0x0000 for Unicode)

SSSP PDU(Access Code) ::=
 FeatureTag FeatureCode ParamExten* ACEndTag

In the foregoing encoding method, the following restrictions apply:

The SSSP PDU (Access Code Encoding) is limited to 16384 characters wide

FeatureCode is limited to 6 characters

Primitive Definition

According to the preferred embodiment at the time of this specification, five PDUTypes have been established including Indication, Command, Request, Response, and Error. The definitions are as follows:

Indication: a message that contains information but does not require action or response.

Command: a message that requires action but no explicit response.

Request: a message that results in action by the remote device and requires an immediate response from it.

Response: a message that is the response to a request.

Error: a message indicating exception information.

The following portions of this disclosure illustrate the use of SSSP for providing Gatekeeper implemented supplementary services. Table 1 provides a summary of example SSSP command and indication primitives. Table 2 provides a summary of example SSSP requests and responses. Table 3 lists requests for code enumeration, while Table 4 lists response code enumeration. Table 5 lists SSSP primitive descriptions. Table 6 lists error codes.

TABLE 1

Command and Indication Primitive Summary.

| Primitive Name | Alpha Numeric String Encoding | DTMF String Encoding |
| --- | --- | --- |
| AGENT LOGIN COMMAND | SP,AGIC,DirectoryNumber | AC1*DirectoryNumber |
| AGENT LOGOUT COMMAND | SP,AGOC, DirectoryNumber | AC2 |
| AGENT INDICATION (YOU ARE AN AGENT) | SP,AGTI,1 | AC3*1 |
| AGENT INDICATION (YOU ARE NOT AN AGENT) | SP,AGTI,0 | AC3*0 |
| BACK TO HELD COMMAND | SP,BTHC | AC4 |
| CALL FORWARD ALWAYS INDICATION | SP,CFAI,DirectoryNumber | AC5*DirectoryNumber |
| CALL FORWARD BUSY INDICATION | SP,CFBI,DirectoryNumber | AC6*DirectoryNumber |
| CALL FORWARD NO ANSWER INDICATION | SP,CFNI,DirectoryNumber | AC7*DirectoryNumber |
| CALL FORWARD OUT OF SERVICE INDICATION | SP,CFOI,DirectoryNumber | AC8*DirectoryNumber |
| CALLING LINE IDENTIFIER INDICATION | SP,CLDI,DirectoryNumber | AC9*DirectoryNumber |
| CALL PROGRESS INDICATION | SP,CPI,DirectoryNumber | AC10*DirectoryNumber |
| CALL WAITING INDICATION | SP,CWI,DirectoryNumber | AC11*DirectoryNumber |
| CANCEL WORK TIMER COMMAND (ENABLE) | SP,CWTC,1 | AC12*1 |
| CANCEL WORK TIMER COMMAND (DISABLE) | SP,CWTC,0 | AC12*0 |
| CANCEL WORK TIMER INDICATION (CANCEL WORK TIMER SUCCESSFUL) | SP,CWTI,1 | AC13*1 |
| CANCEL WORK TIMER INDICATION (CANCEL WORK TIMER UNSUCCESSFUL) | SP,CWTI,0 | AC13*0 |
| CONFERENCE COMMAND | SP,CONC | AC14 |
| CONFERENCE INDICATION | SP,CONI | AC15 |
| CONSULTATION CALL COMMAND | SP,CCC,DirectoryNumber | AC16*DirectoryNumber |
| DIRECTED PICKUP COMMAND | SP,DPC,DirectoryNumber | AC17*DirectoryNumber |
| DO NOT DISTURB COMMAND (DISABLE) | SP,DNDC,0 | AC18*0 |
| DO NOT DISTURB COMMAND (ENABLE) | SP,DNDC,1 | AC18*1 |
| DO NOT DISTURB INDICATION (DO NOT DISTURB IS ON) | SP,DNDI,1 | AC19*1 |
| DO NOT DISTURB INDICATION (DO NOT DISTURB IS OFF) | SP,DNDI,0 | AC19*0 |
| ENDPOINT MAINTENANCE DATA INDICATION | SP,EMDI,VersionIdentifier,Mac Address | AC20*VersionIdentifier* MacAddress |
| ERROR INDICATION | SP,ERRI, ErrorNumber | AC21 *ErrorNumber |
| FORCE PARTY RELEASE COMMAND | SP,FPRC | AC22 |
| GROUP PICKUP COMMAND | SP,GPC | AC23 |
| GROUP PICKUP INDICATION (PICKUP AVAILABLE) | SP,GPI,1 | AC24*1 |
| GROUP PICKUP INDICATION (PICKUP UNAVAILABLE) | SP,GPI,0 | AC24*0 |
| HOLD COMMAND | SP,HDC | AC25 |
| HOLD INDICATION | SP,HDI | AC26 |
| MAKE BUSY COMMAND (DISABLE) | SP,MBYC,0 | AC27*0 |
| MAKE BUSY COMMAND (ENABLE) | SP,MBYC,1 | AC27*1 |
| MAKE BUSY INDICATION (MAKE BUSY IS SET) | SP,MBYI,1 | AC28*1 |
| MAKE BUSY INDICATION (MAKE BUSY IS NOT SET) | SP,MBYI,0 | AC28*0 |
| MESSAGE WAITING INDICATION | SP,MWI,TotalMessages | AC29*TotalMessages |
| NIGHT SERVICE PICKUP COMMAND | SP,NPC,DirectoryNumber | AC30*DirectoryNumber |

TABLE 1-continued

Command and Indication Primitive Summary.

| Primitive Name | Alpha Numeric String Encoding | DTMF String Encoding |
| --- | --- | --- |
| PLAY CONTINUOUS TONE COMMAND | SP,PCTC,ToneNumber | AC31*ToneNumber |
| PLAY SHORT TONE COMMAND | SP,PSTC,ToneNumber,ToneDuration | AC32*ToneNumber*ToneDuration |
| SWAP COMMAND | SP,SWPC | AC33 |
| UN-PARK COMMAND | SP,UPKC,DirectoryNumber | AC34*DirectoryNumber |

Where:
DirectoryNumber ::= DirectoryNumberType (MaxSize(255))
TotalMessages ::= NumberType (MaxSize(5))
MacAddress ::= MacAddressType
ToneNumber ::= NumberType (MaxSize(5))
ToneDuration ::= NumberType (MaxSize(5))
VersionIdentifier ::= NumberType (MaxSize(5))
ErrorNumber ::= NumberType (MaxSize(8))

TABLE 2

Request Response Primitive Summary.

| Primitive Name | Alpha Numeric String Encoding | DTMF String Encoding |
| --- | --- | --- |
| AGENT LOGIN REQUEST | SP,AGIC,DirectoryNumber | AC35*DirectoryNumber |
| AGENT LOGIN RESPONSE | SP,AGTI,ResponseCode | AC36*ResponseCode |
| AGENT LOGOUT REQUEST | SP,AGOC,DirectoryNumber | AC37*DirectoryNumber |
| AGENT LOGOUT RESPONSE | SP,AGTI,ResponseCode | AC38*ResponseCode |
| BACK TO HELD REQUEST | SP,BTHQ | AC39 |
| BACK TO HELD RESPONSE | SP,BTHR,ResponseCode | AC40*ResponseCode |
| CANCEL WORK TIMER REQUEST | SP,CWTC,RequestCode | AC41*RequestCode |
| CANCEL WORK TIMER RESPONSE | SP,CWTC,ResponseCode | AC42*ResponseCode |
| CONFERENCE REQUEST | SP,CONQ | AC43 |
| CONFERENCE RESPONSE | SP,CONR,ResponseCode | AC44*ResponseCode |
| CONSULTATION CALL REQUEST | SP,CCQ,DirectoryNumber | AC45*DirectoryNumber |
| CONSULTATION CALL RESPONSE | SP,CCR,ResponseCode | AC46*ResponseCode |
| DIRECTED PICKUP REQUEST | SP,DPQ,DirectoryNumber | AC47*DirectoryNumber |
| DIRECTED PICKUP RESPONSE | SP,DPR,ResponseCode | AC48*ResponseCode |
| DO NOT DISTURB REQUEST | SP,DNDC,RequestCode | AC49*RequestCode |
| DO NOT DISTURB RESPONSE | SP,DNDC,ResponseCode | AC50*ResponseCode |
| FORCE PARTY RELEASE REQUEST | SP,FPRQ | AC51 |
| FORCE PARTY RELEASE RESPONSE | SP,FPRR,ResponseCode | AC52*ResponseCode |
| GROUP PICKUP REQUEST | SP,GPQ | AC53 |
| GROUP PICKUP RESPONSE | SP,GPR,ResponseCode | AC54*ResponseCode |
| HOLD REQUEST | SP,HDQ | AC55 |
| HOLD RESPONSE | SP,HDR,ResponseCode | AC56*ResponseCode |
| MAKE BUSY REQUEST | SP,MBYQ,RequestCode | AC57*RequestCode |
| MAKE BUSY RESPONSE | SP,MBYR,ResponseCode | AC58*ResponseCode |
| NIGHT SERVICE PICKUP REQUEST | SP,NPQ,DirectoryNumber | AC59*DirectoryNumber |
| NIGHT SERVICE PICKUP RESPONSE | SP,NPR,ResponseCode | AC60*ResponseCode |
| PLAY CONTINUOUS TONE REQUEST | SP,PCTQ,ToneNumber | AC70*ToneNumber |
| PLAY CONTINUOUS TONE RESPONSE | SP,PCTR,ResponseCode | AC71*ResponseCode |
| PLAY SHORT TONE REQUEST | SP,PSTQ,ToneNumber,ToneDuration | AC72*ToneNumber*ToneDuration |
| PLAY SHORT TONE RESPONSE | SP,PSTR,ResponseCode | AC73*ResponseCode |
| SWAP REQUEST | SP,SWPQ | AC74 |
| SWAP RESPONSE | SP,SWPR,ResponseCode | AC75*ResponseCode |
| UN-PARK REQUEST | SP,UPKC,DirectoryNumber | AC76*DirectoryNumber |
| UN-PARK RESPONSE | SP,UPKR,ResponseCode | AC77*ResponseCode |

Where:
DirectoryNumber ::= DirectoyNumberType (MaxSize(255))
TotalMessages ::= NumberType (MaxSize(5))
MacAddress ::= MacAddress Type
ToneNumber ::= NumberType (MaxSize(5))
ToneDuration ::= NumberType (MaxSize(5))
VersionIdentifier ::= NumberType (MaxSize(5))
ErrorNumber ::= NumberType (MaxSize(8))
ResponseCode ::= NumberType (MaxSize(16))
RequestCode ::= NumberType (MaxSize(16))

TABLE 3

Request Code Enumeration.

| Request Code Description | Request Code Value |
|---|---|
| Disable Feature | 0 |
| Enable Feature | 1 |

TABLE 4

Response Code Enumeration.

| Response Code Description | Response Code Value |
|---|---|
| Request Failed | 0 |
| Request Successful | 1 |

TABLE 5

SSSP Primitive Description.

| | |
|---|---|
| AGENT LOGIN | |
| COMMAND | A command sent from an EP to a GK to indicate that the EP wishes to become an ACD Agent. |
| REQUEST | A request sent from an EP to a GK to indicate that the EP wishes to become an ACD Agent. |
| RESPONSE | A response to a Agent Login Request indicating if the request was successful or not successful. |
| AGENT LOGOUT | |
| COMMAND | A command sent from an EP to a GK to indicate that the EP wishes logout as an ACD Agent. |
| REQUEST | A request sent from an EP to a GK to indicate that the EP wishes logout as an ACD Agent. |
| RESPONSE | A response to a Agent Logout Request indicating if the request was successful or not successful. |
| AGENT | |
| INDICATION | An indication sent from a GK to an EP indicating the current state of the EP as an ACD Agent. The message indicates whether the EP is seen as an ACD Agent or not as an ACD agent by the GK. |
| BACK TO HELD | |
| COMMAND | A command sent from an EP to the GK to instruct the GK to release the current active call and swap back to the held call on consultation hold. |
| REQUEST | A request sent from an EP to the GK to instruct the GK to release the current active call and swap back to the held call on consultation hold. |
| RESPONSE | A response to a Back to Held Request indicating if the request was successful or not successful. |
| CALL FORWARD ALWAYS | |
| INDICATION | An indication sent from the GK to an originating EP that the call has been redirected to another endpoint due to the call forward always feature set by original destination. |
| CALL FORWARD BUSY | |
| INDICATION | An indication sent from the GK to an originating EP that the call has been redirected to another endpoint due to the call forward busy feature set by original destination. |
| CALL FORWARD NO ANSWER | |
| INDICATION | An indication sent from the GK to an originating EP that the call has been redirected to another endpoint due to the call forward no answer feature set by original destination. |
| CALL FORWARD OUT OF SERVICE | |
| INDICATION | An indication sent from the GK to an originating EP that the call has been redirected to another endpoint due to the call forward out of service feature set by original destination. |
| CALLING LINE IDENTIFIER | |
| INDICATION | An indication sent from the GK to an EP stating the destination alias (Directory Number) of the current destination that the Endpoint is in call with. |
| CALLING PROGRESS | |
| INDICATION | An indication from the GK to an EP stating that the GK is making a call on behalf of that endpoint. |
| CALLING WAITING | |
| INDICATION | An indication from the GK to a busy EP that an EP has been camped on to it by the system. |
| CANCEL WORK TIMER | |
| COMMAND | A command sent from an EP to the GK to indicate that it wishes to enable or disable the Cancel Work Timer feature. |
| INDICATION | An indication sent from the GK to an EP indicating the current state of the work timer (if the work timer is currently canceled or not). |
| REQUEST | A request sent from an EP to the GK to indicate that it wishes to enable or disable the Cancel Work Timer feature. |
| RESPONSE | A response to a Cancel Work Timer Request indicating if the request was successful or not successful. |
| CONFERENCE | |
| COMMAND | A command sent from an EP, that originated a consultation call, to the GK/Multipoint Controller (MC) that it wishes to conference in the current party into an existing conference that the originating EP is in. If the situation involves starting a three party conference, then the party on consultation hold will be brought into the active conference (adhoc conference expansion). |
| INDICATION | An indication sent from the GK/MC to an endpoint that the conference has been initiated or a new participant has entered the conference. |
| REQUEST | A request sent from an EP, that originated a consultation call, to the GK/Multipoint Controller (MC) that it wishes to conference in the current party into an existing conference that the originating EP is in. If the situation involves starting a three party conference, then the party on consultation hold will be brought into the active conference (adhoc conference expansion). |
| RESPONSE | A response to a Conference Request indicating if the request was successful or not successful. |
| CONSULTATION CALL | |
| COMMAND | A command sent from an EP to the GK indicating that it wishes to place a consultation call to a destination. |
| REQUEST | A request sent from an EP to the GK indicating that it wishes to place a consultation call to a destination. |
| RESPONSE | A response to a Consultation Call Request indicating if the request was successful or not successful. |

TABLE 5-continued

SSSP Primitive Description.

| | |
|---|---|
| DIRECTED PICKUP | |
| COMMAND | A command sent from an EP to the GK to indicate that it wishes to perform a directed pickup. |
| REQUEST | A request sent from an EP to the GK to indicate that it wishes to perform a directed pickup. |
| RESPONSE | A response to a Directed Pickup Request indicating if the request was successful or not successful. |
| DO NOT DISTURB | |
| COMMAND | A command sent from an EP to the GK to indicate that it wishes to enable or disable the Do Not Disturb feature. |
| INDICATION | An indication sent from the GK to an EP to indicate the status of the Do Not Disturb feature. |
| REQUEST | A request sent from an EP to the GK to indicate that it wishes to enable or disable the Do Not Disturb feature. |
| RESPONSE | A response to a Do not Disturb Request indicating if the request was successful or not successful. |
| ENDPOINT MAINTENANCE | |
| INDICATION | The purpose of this message is to send any pertinent maintenance information from an Endpoint to a GK. |
| ERROR | |
| INDICATION | An indication providing an entity feedback on an exception situation. The supported error codes are listed in Table 6. |
| FORCE PARTY RELEASE | |
| COMMAND | A command sent from an EP to a GK to instruct the GK to keep the current active call and release the party that was placed on consultation hold by the EP |
| REQUEST | A request sent from an EP to a GK to instruct the GK to keep the current active call and release the party that was placed on consultation hold by the EP |
| RESPONSE | A response to a Force Party Release Request indicating if the request was successful or not successful. |
| GROUP PICKUP | |
| COMMAND | A command sent from an EP to the GK to indicate that it wishes to perform a group pickup. |
| INDICATION | An indication sent from the GK to an EP that the group pickup option is available or unavailable to the EP. |
| REQUEST | A request sent from an EP to the GK to indicate that it wishes to perform a group pickup. |
| RESPONSE | A response to a Group Pickup Request indicating if the request was successful or not successful. |
| HOLD | |
| COMMAND | A command sent from an EP to the GK to instruct the GK to place the current call the EP is involved in on hold. |
| INDICATION | An indication sent from the GK to an EP that it has been placed on hold by the GK. |
| REQUEST | A request sent from an EP to the GK that asks the GK to place the current call the EP is involved in on hold. |
| RESPONSE | A response to a Hold Request indicating if the request was successful or not successful. |
| MAKE BUSY | |
| COMMAND | A command sent from an EP to the GK to indicate that it wishes to enable or disable the Make Busy feature. |
| INDICATION | An indication sent from a GK to an EP to indicate the status of the Make Busy feature (whether the Make Busy feature is active or not). |
| REQUEST | A request sent from an EP to the GK to indicate that it wishes to enable or disable the Make Busy feature. |
| RESPONSE | A response to a Make Busy Request indicating if the request was successful or not successful. |
| MESSAGE WAITING | |
| INDICATION | An indication sent from the GK to an Endpoint to indicate that a message is available for the user. |
| NIGHT SERVICE PICKUP | |
| COMMAND | A command sent from an EP to the GK to indicate that it wishes to pickup a night call. |
| REQUEST | A request sent from an EP to the GK to indicate that it wishes to pickup a night call. |
| RESPONSE | A response to a Night Service Pickup Request indicating if the request was successful or not successful. |
| PLAY CONTINUOUS TONE | |
| COMMAND | A command from the GK to an EP to play a continuous audio tone. |
| REQUEST RESPONSE | A response to a Play Continuous Tone Request indicating if the request was successful or not successful. |
| PLAY SHORT TONE | |
| COMMAND | A command from the GK to an EP to play an audio tone for a finite duration. |
| REQUEST RESPONSE | A response to a Play Short Tone Request indicating if the request was successful or not successful. |
| SWAP | |
| COMMAND | A command sent from an EP to the GK to swap the call that the EP is involved with to a camped on call or a call on hold. |
| REQUEST RESPONSE | A response to a Swap Request indicating if the request was successful or not successful. |
| UN-PARK | |
| COMMAND | A command sent from an EP to the GK to retrieve a parked call. |
| REQUEST | A request sent from an EP to the GK to retrieve a parked call. |
| RESPONSE | A response to a Un-Park Request indicating if the request was successful or not successful. |

TABLE 6

Error Codes for Error Indication.

| Error Number | Error Code Name | Error Code Description |
|---|---|---|
| 0 | Reserved | Not to be used |
| 1 | Conference_Unknown_Error | A conference operation has failed. The reason for failure is not known. |

Rules for Expandability

There are two groups of rules for expanding the SSSP protocol, one for AlphaNumeric String Encoding and the other for DTMF String Encoding.

When adding new PDUs, the new PDU is defined based on the definition of PrimitiveName as set forth above. For extending existing PDU's, parameter expansion follows the rule of simply adding additional ParameterExtenstions to the end of the PDU.

Previously defined parameters are not removed from an existing PDU when new versions of a PDU are implemented, for backward compatibility. Endpoints supporting older versions of SSSP ignore parameters outside the scope of their known PDU templates.

Alphanumeric String Encoding Expansion Rules

The following is an example of expanding an existing PDU:

Pre-Conditions:

1. The Consultation Call Command PDU is to be expanded to support an Alias Field.

Additional Encoding:

Parameter Extensions Required:
1. UNICODESTRINGTYPE ::= sequence of 16 bit characters (UNICODE).
2. Parameters ::= DirectoryNumberType | NumberType | MacAddressType | UNICODESTRINGTYPE

SSSP PDU:

SP,CCC,DirectoryNumber,AliasName

Where:DirectoryNumber ::= DirectoryNumberType (MaxSize(255))
AliasName ::= UNICODESTRINGTYPE (MaxSize(255))

DTMF String Code Encoding Expansion Rules

The following is a example of expanding an existing PDU:

Pre-Conditions:
1. The Hold Indication PDU will be expanded to support the IP address of the Music on Hold source to connect to.

Additional Encoding:

Parameter Extensions Required:
1. IP4AddressType ::= IP4Parm '*' IP4Param '*' IP4Param '*' IP4Param Where IP4Param ::= NumberType (MaxSize(3))
2. Parameters ::= NumberType | IP4AddressType

SSSP PDU:

SP,HDI,MusicOnHoldAddress

Where: MusicOnHoldAddress ::= IP4AddressType

SSSP Transport

Being an application layer protocol, SSSP can be carried within any non-standard data field of a H.225 or H.245 message. For the preferred embodiment set forth herein, SSSP messages are carried within the RAS Location Request (LRQ) and Location Confirmation (LCF) messages in the following examples.

Using LRQ/LCF for SSSP Transport

SSSP messages are carried within the nonStandardData field of the LRQ and LCF message. For simplicity, the LRQ and LCF are not be used for address translation functionality and the sending and receiving entity regards the LRQ and LCF as a transport mechanism for SSSP only. An independent location request/response exchange is initiated for address translation services.

Figure 2:
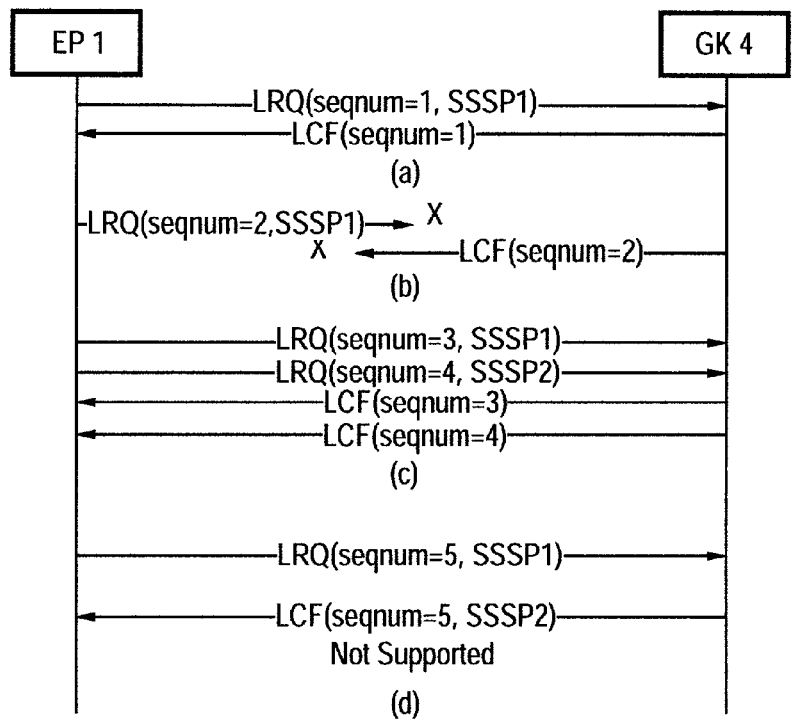
FIG. 2 shows message flow between the Gatekeeper and H.323 endpoint for SSSP message transport, according to the preferred embodiment.

FIG. 2 provides illustrations for common SSSP message exchange scenarios between signaling entities. The examples shown are requests from an EP 1 to a GK 4. Though not shown, the procedures for GK 4 to EP 1 exchange scenarios are the same as for EP 1 to GK 4.

FIG. 2 (a) is a scenario where a SSSP message (SSSP1) is sent from an EP 1 to the GK 4 with SSSP message piggybacking disabled. The GK 4 receives the message and acknowledges it with a LCF. This is a simple request and acknowledge exchange.

FIG. 2 (b) provides an example where a SSSP request is lost or the acknowledgement for the SSSP request is lost. The timeout and retry mechanism specified by H.323 for LRQ/LCF/LRJ will determine this and the sender entity (EP 1) receives a time out error from the protocol stack.

FIG. 2 (c) illustrates a situation where an application proceeds to send two SSSP requests in parallel. This scenario is similar to "windowing" techniques for network protocols.

FIG. 2 (d) represents a "piggyback" situation. A SSSP message (SSSP2) is sent in the acknowledgement LCF to save a round trip delay.

LRQ/LCF Attribute Encoding

TABLE 7

Endpoint Sending a SSSP Message in a LRQ.

| Attribute | Value |
|---|---|
| RequestSeqNum | 16 bit value |
| EndpointIdentifier | Same as the value returned in H.323 Registration Confirmation (RCF) Message |
| DestinationInfo | Endpoints E.164 alias |
| NonStandardData | SSSP message |
| ReplyAddress | Endpoint RAS transport Address |
| SourceInfo | Not included |
| CanMapAlias | False |
| GatekeeperIdentifier | Not included |
| Tokens | Not included |
| CryptoTokens | Not included |
| IntegrityCheckValue | Not included |

TABLE 8

GK Responding to a SSSP Message in a LCF.

| Attribute | Value |
|---|---|
| RequestSeqNum | 16 bit value, corresponding to the RequestSeqNum value in LRQ |
| CallSignalAddress | IP = 0.0.0.0, Port = 0 |
| RasAddress | IP = 0.0.0.0, Port = 0 |
| NonStandardData | Not Included |
| DestinationInfo | Not Included |
| DestinationCallInfo | Not Included |
| DestinationType | Not Included |
| RemoteExtensionAddress | Not Included |
| AlternateEndpoints | Not Included |
| Tokens | Not Included |
| CryptoTokens | Not Included |
| IntegrityCheckValue | Not Included |

TABLE 9

GK Sending a SSSP Message in a LRQ.

| Attribute | Value |
|---|---|
| RequestSeqNum | 16 bit value |
| EndpointIdentifier | Not Included |

TABLE 9-continued

GK Sending a SSSP Message in a LRQ.

| Attribute | Value |
| --- | --- |
| DestinationInfo | Endpoints E.164 alias |
| NonStandardData | SSSP message |
| ReplyAddress | GK RAS transport Address |
| SourceInfo | Not included |
| CanMapAlias | False |
| GatekeeperIdentifier | Not included |
| Tokens | Not included |
| CryptoTokens | Not included |
| IntegrityCheckValue | Not included |

TABLE 10

Endpoint Responding to a SSSP Message in a LCF.

| Attribute | Value |
| --- | --- |
| RequestSeqNum | 16 bit value, corresponding to the RequestSeqNum value in LRQ |
| CallSignalAddress | Endpoints Call Signaling Address |
| RasAddress | Endpoints RAS Address |
| NonStandardData | Not Included |
| DestinationInfo | Not Included |
| DestinationCallInfo | Not Included |
| DestinationType | Not Included |
| RemoteExtensionAddress | Not Included |
| AlternateEndpoints | Not Included |
| Tokens | Not Included |
| CryptoTokens | Not Included |
| IntegrityCheckValue | Not Included |

Message Sequence Charts

The following sub-sections contain message sequence charts (MSCs) to provide guidance for the developer to implement SSSP in Endpoints and Gatekeepers. The format of the MSC is as follows:

```
MSC_MESSAGE::=
H.225/H.245MESSAGENAME'('H.225'['SSSPPDU']'')'
Where:
MSC_MESSAGE is a message in the MSC
H.225/H.245MESSAGENAME is the primitive name
for a H.225/H.245MESSAGE (for example SETUP)
H.225 are parameters within the H.225 message
SSSPPDU represents the SSSP PDU
```

H.225 and H.245 parameters that are mandatory within the H.225 and H.245 message are not presented within the message diagrams of FIGS. 3 to 26, for simplicity. In addition, repetitive and well known interactions, such as the H.245 sequence for basic call, are not presented. The following H.225 parameter clarification should be noted:

CALLx: Represents all the necessary identifiers to represent call x. This includes Call Reference Value (CRV), Call Identifier (CallID), and Conference Identifier (ConfID)

DDN: Destination Directory Number (Destination E.164 Alias)

FIGS. 3 to 7 are examples of Call Independedent Supplementary Services, whereas the scenarios of FIGS. 8 to 26 are examples of Call Dependent Supplementary Services.

Figure 3:
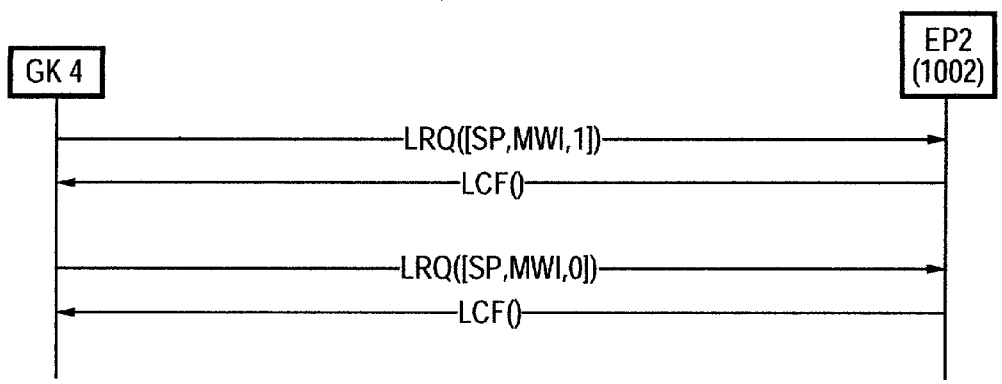
FIG. 3 shows message flow using SSSP for implementing a message waiting indication.

In the scenario of FIG. 3 the GK 4 informs EP2 when messages are available or unavailable.

The message sequence is as follows:
1. Assume that EP2 has just registered with the GK 4 and the GK 4 has determined that EP2 has messages available.
2. The GK 4 sends a Message Waiting Indication SSP PDU with a parameter>0 to indicate that there is a message available for EP2. Since the GK 4 does not have the capability of sending the amount of messages available to a user, the number of messages is defaulted to 1. This follows the same behavior for the SX2000 (LW29)
3. Upon receiving the MWI, EP2 provides visual indication to indicate that one or more messages are available. This could be in the form of a flashing Light Emitting Diode (LED) or an icon on the phone LCD display.
4. Once all the messages have been retrieved by the user at EP2, the GK 4 will send a MWI with a parameter of 0 to represent 0 messages available.
5. Upon receiving the MWI with parameter 0, the Endpoint should remove all visual indications representing a waiting message.
6. During the period of EP2's registration with the GK 4, the GK 4 may determine that more messages are available. If messages are determined to be available sometime after the initial registration on EP2, the GK 4 shall follow the procedures outline in step 2 above.

Figure 4:
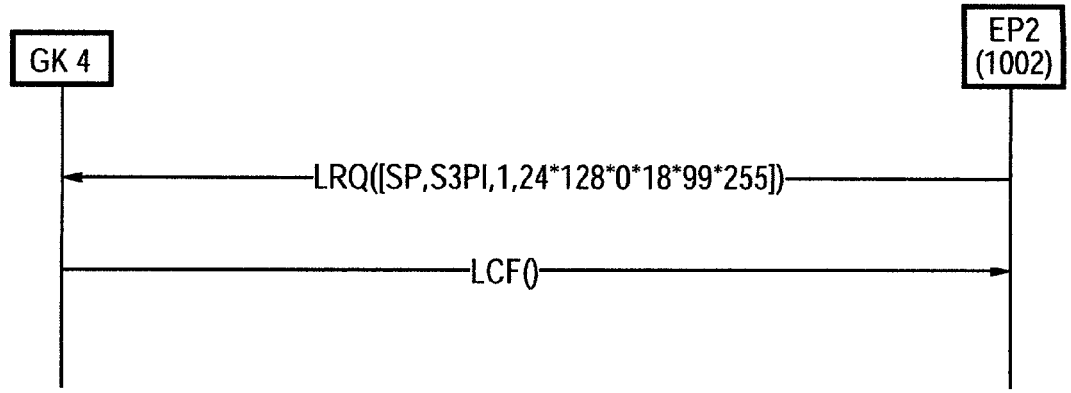
FIG. 4 shows message flow using SSSP for implementing an endpoint maintenance data indication.

In the scenario of FIG. 4 EP2 provides its Maintenance Data to the GK 4 after Registration with the GK 4.

The message sequence is as follows:
1. After successful registration, EP2 should provide the GK 4 with maintenance data. Endpoint 2 sends a Endpoint Maintenance Data Indication containing the VersionNumber of 1 (SSSP version 1) and MacAddress of 24*128*0*18*99*255.

Figure 5:
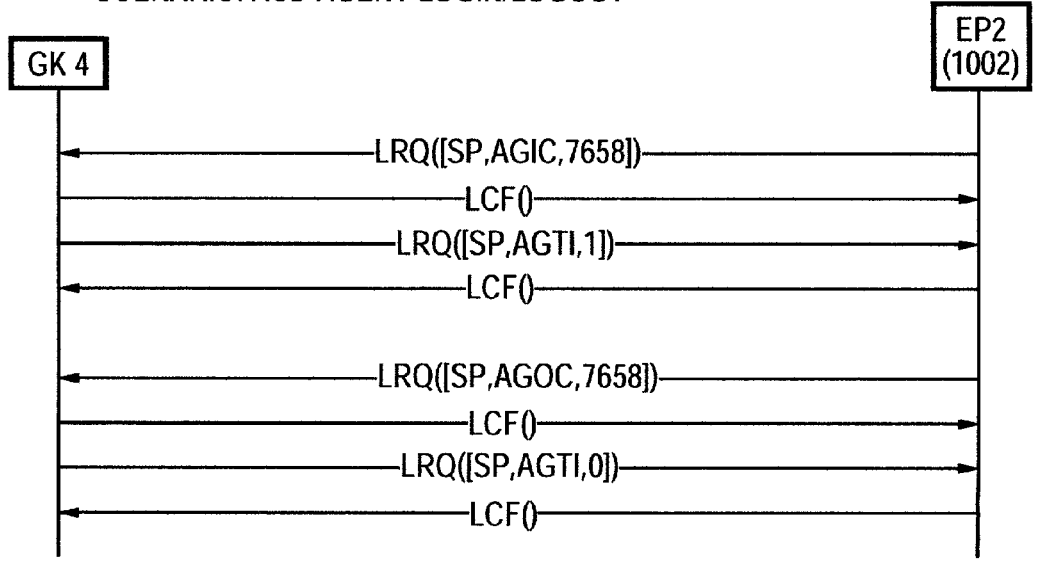
FIG. 5 shows message flow using SSSP for implementing ACD agent login and logout.

FIG. 5 shows ACD Agent Login and Logout.
The message sequence is as follows:
To Login:
1. The user at EP2 has selected the option at the endpoint to login as an ACD Agent. The Terminal will prompt the user to enter a DN representing the Agent ID, the example has a code of 7658. Once the code is entered, EP2 will send an AGENT LOGIN COMMAND to the GK 4 containing a parameter of 7658.
2. The GK 4 will send back an AGENT LOGIN INDICATION to the Terminal indicating if the user has become an agent or not. A parameter of '1' indicates that the user at EP2 is considered an ACD Agent by the GK 4 (successful login). The EP should provide a visual indication (e.g. an icon) on the LCD display to indicate that the user is considered an agent.

To Logout:
1. The user then selects the Agent Logout option. The Terminal will prompt the user to enter a DN representing the Agent ID (example 7658). EP2 sends an AGENT LOGOUT COMMAND with DirectoryNumber equal to the DN entered by the user.
2. The GK 4 will send back an AGENT LOGIN INDICATION to the Terminal indicating if the user is an Agent or not an Agent. A parameter of '0' indicates that the GK 4 does not currently consider the user at EP2 as an ACD Agent (successful logout). The EP should remove all visual indication related to an Agent (e.g. remove icon).

Figure 6:
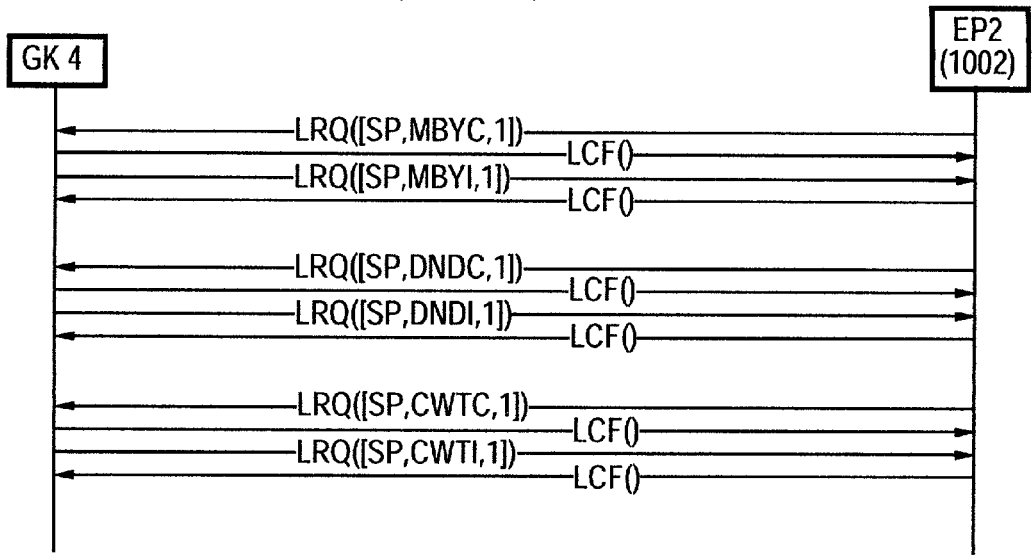
FIG. 6 shows message flow using SSSP for implementing a make busy, DND, cancel work timer.

In the scenario of FIG. 6 Enable Make Busy, DND, and Cancel Work Timer features are shown.

The message sequence is as follows:
1. The user at EP2 selects an option at the endpoint to enable the MAKE BUSY, Do Not Disturb, or Cancel Work Timer. When the user selects the enable MAKE BUSY feature. EP2 will send a MAKE BUSY COMMAND SSSP PDU to the GK 4. When the user selects enable Do Not Disturb at the EP, EP2 will send a DO NOT DISTURB COMMAND. EP2 will send a CANCEL WORK TIMER COMMAND PDU to the GK 4 when the user selects enable Cancel Work Timer. Each of the PDUs will contain a parameter '1' to represent enabling of the feature.
2. The GK 4 will send back the appropriate indications to the Terminal indicating the state of the command. If the feature is enabled, the parameter will be '1'. If the feature is still disabled a parameter '0' will be sent.

Figure 7:
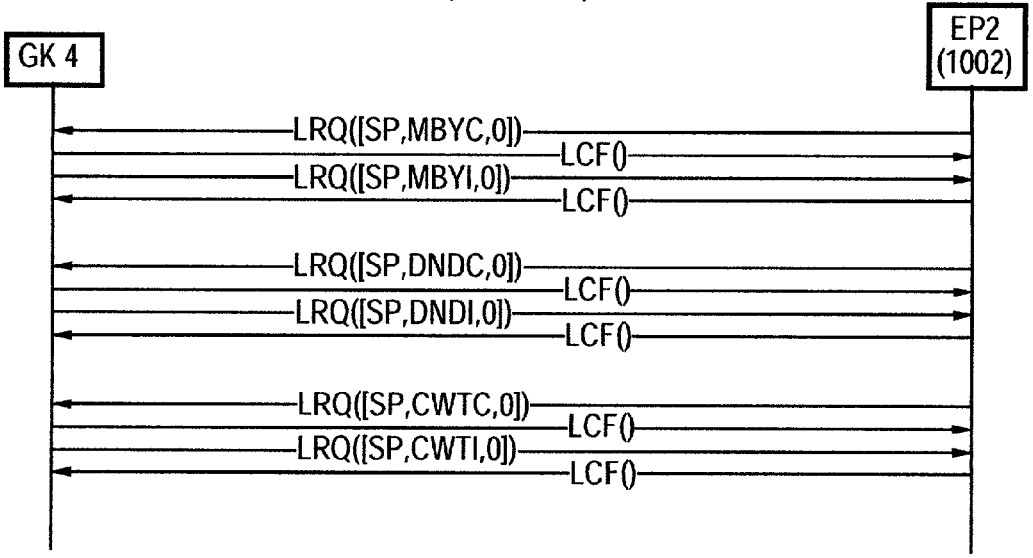
FIG. 7 shows message flow using SSSP for disabling a make busy, DND, cancel work timer.

In the scenario of FIG. 7 Make Busy, DND, and Cancel Work Timer features previously enabled are disabled.

The message sequence is as follows:
1. The scenario is the reciprocal of the enable feature scenario listed above. The user selects the disable Make Busy, Do Not Disturb, or Cancel Work Timer option to disable the respective feature. The difference between the enabling and disabling scenario is the parameter sent in the SSSP PDU. A parameter of '0' is sent in the MAKE BUSY COMMAND, DO NOT DISTURB COMMAND, or CANCEL WORK TIMER COMMAND to represent disabling of the feature.
2. The GK 4 will send back the appropriate indications to the Terminal indicating the state of the command. If the feature is enabled, the parameter will be '1'. If the feature is still disabled a parameter '0' will be sent.

Figure 8:
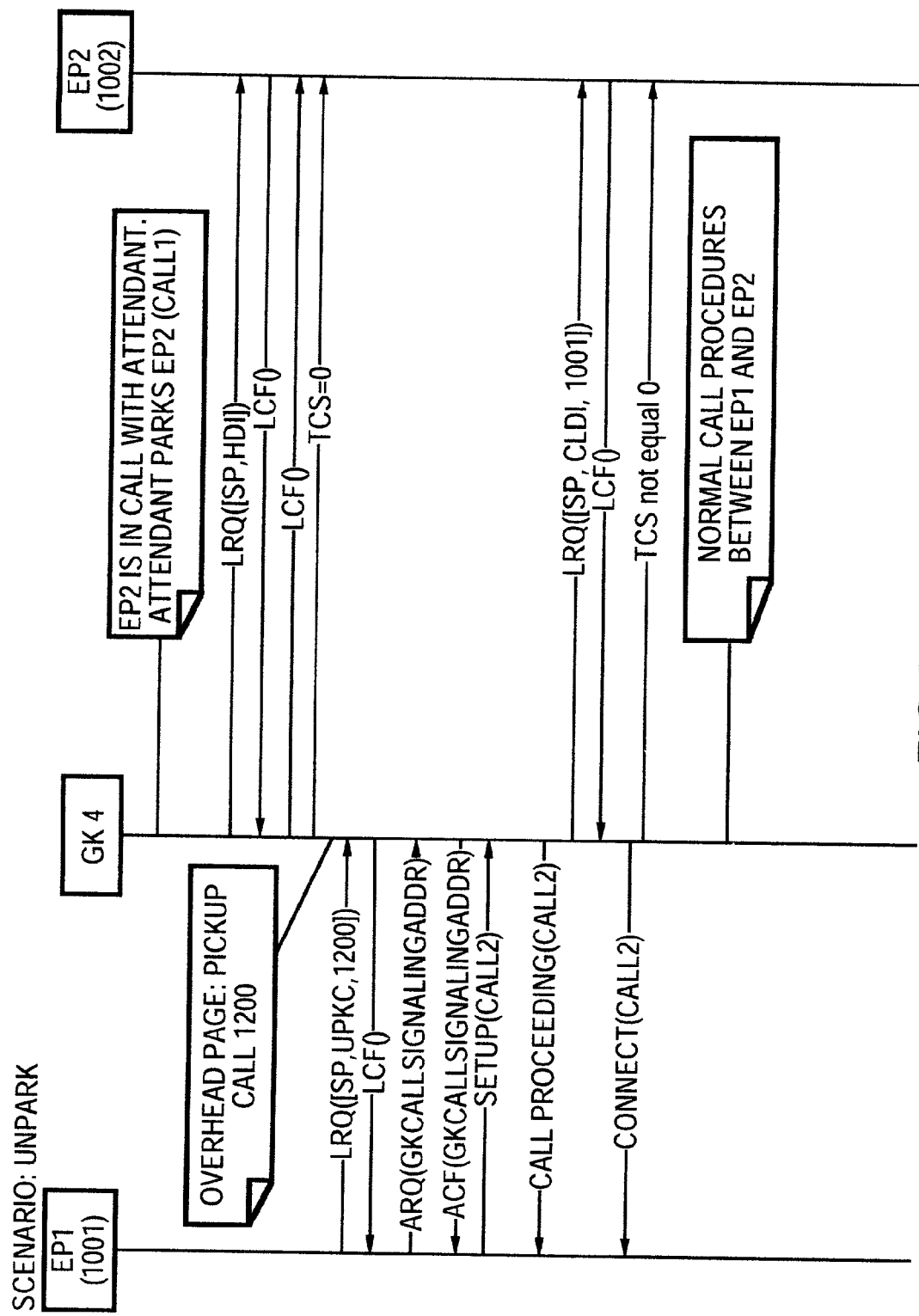
FIG. 8 shows message flow using SSSP for unparking a call.

In the scenario of FIG. 8, a Unpark a call parked by an attendant feature is shown.

The message sequence is as follows:
1. An attendant has parked EP2. Assuming EP2 is a H.323 Endpoint, the GK 4 will send a HOLD INDICATION SSSP PDU and a PAUSE message (TCS=0). EP2 should provide the appropriate visual indication that represents hold.
2. The user of EP1 is notified the parked call by some form of out of band method (such as an overhead page)
3. The user at EP1 proceeds to un-park the call by selecting the un-park feature option and enters a un-park code of 1200.
4. EP1 proceeds to initiate a call:
   Sends an UN-PARK COMMAND SSSP PDU containing a parameter 1200 representing the un-park code.
   The ARQ shall contain all mandatory parameters. In addition, the message shall not contain a destination alias. The message shall contain the GK 4 call signaling address as the destination call signaling address.
   The SETUP message sent shall contain all mandatory parameters. The message shall not contain any source or destination addressing.
   The CRV, Call ID, and Conference ID should be different than that for EP2.
5. Once the GK 4 receives the UN-PARK COMMAND, the GK 4 will send a CONNECT message to EP1 and proceed to send a CALLING LINE IDENTIFIER INDICATION SSSP PDU and a RESUME message (TCS not 0) to EP2. EP2 should display its default talk state display.
6. Normal H.245 procedures occur between EP1 and EP2

Figure 9:
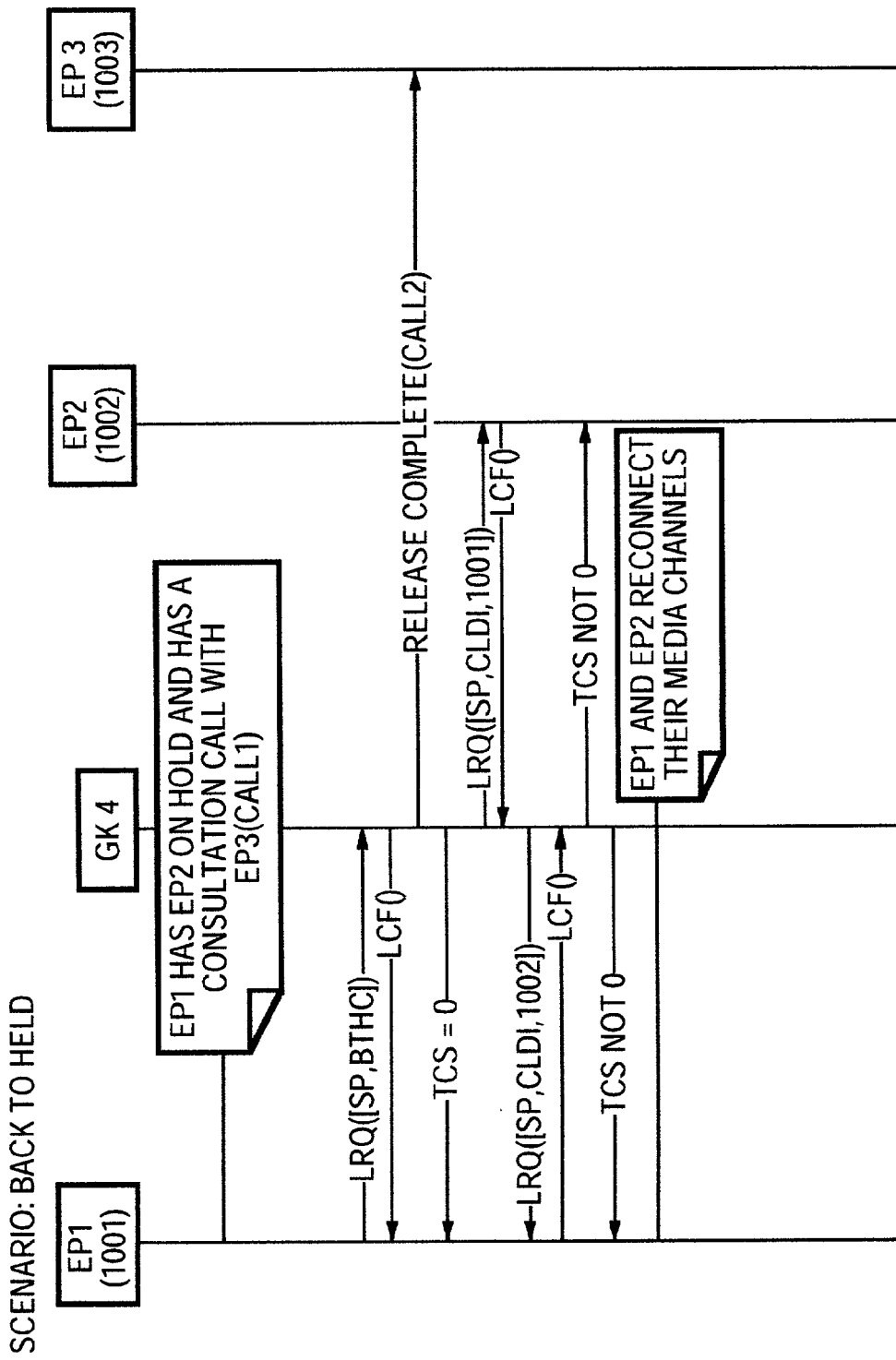
FIG. 9 shows message flow using SSSP for implementing a back to held feature.

In the scenario of FIG. 9 a Back to Held feature is shown.

The message sequence is as follows:
1. The call between EP1 and EP2 is on hold and EP1 is in consultation call with EP3.
2. The user at EP1 decides that he/she wishes to go back to the call with EP2 by selecting the Back to Held feature option.
3. EP1 sends a BACK TO HELD COMMAND SSSP PDU to the GK 4 in a H245USERINPUTINDICATION.
4. The GK 4 drops the leg of the call between the GK 4 and EP3
5. The GK 4 takes EP2 off hold by sending a TCS not equal 0 to EP2, and also sends a CALLING LINE IDENTIFIER INDICATION to EP2. EP2 should display its default talk state display. The GK 4 will also send a CALLING LINE IDENTIFIER SSSP PDU and TCS not equal 0 to EP1. EP1 should display its default talk state display.
6. Normal H.245 connection procedures occur after both TCS not equal to 0. H.245 messages are sent from the GK 4.

Figure 10:
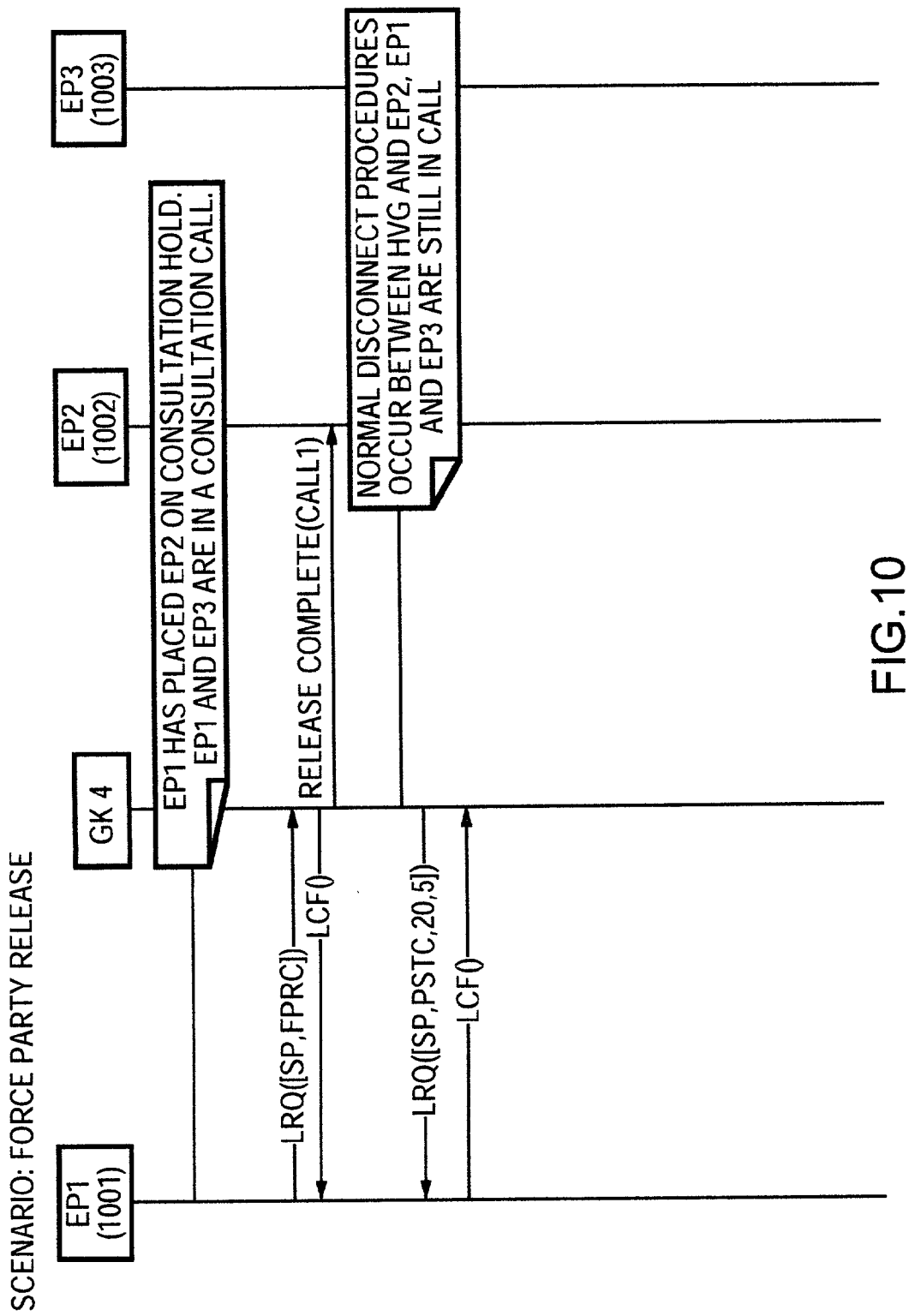
FIG. 10 shows message flow using SSSP for implementing a force party release.

In the scenario of FIG. 10 a Force Party Release feature is shown.

The message sequence is as follows:
1. EP1 has EP2 on Consultation Hold. In addition EP1 is in an active consultation call with EP3.
2. The user at EP1 decides to drop the held call with EP2 by selecting the force party release feature option.
3. EP1 sends a FORCE PARTY RELEASE COMMAND SSSP PDU to the GK 4.
4. The GK 4 proxies disconnect procedures with EP2 and the half call with EP2 is removed.
1. The GK 4 sends back a PLAY SHORT TONE COMMAND to EP1 so it will provide audio indication of the outcome of the FORCE PARTY RELEASE COMMAND.

Figure 11:
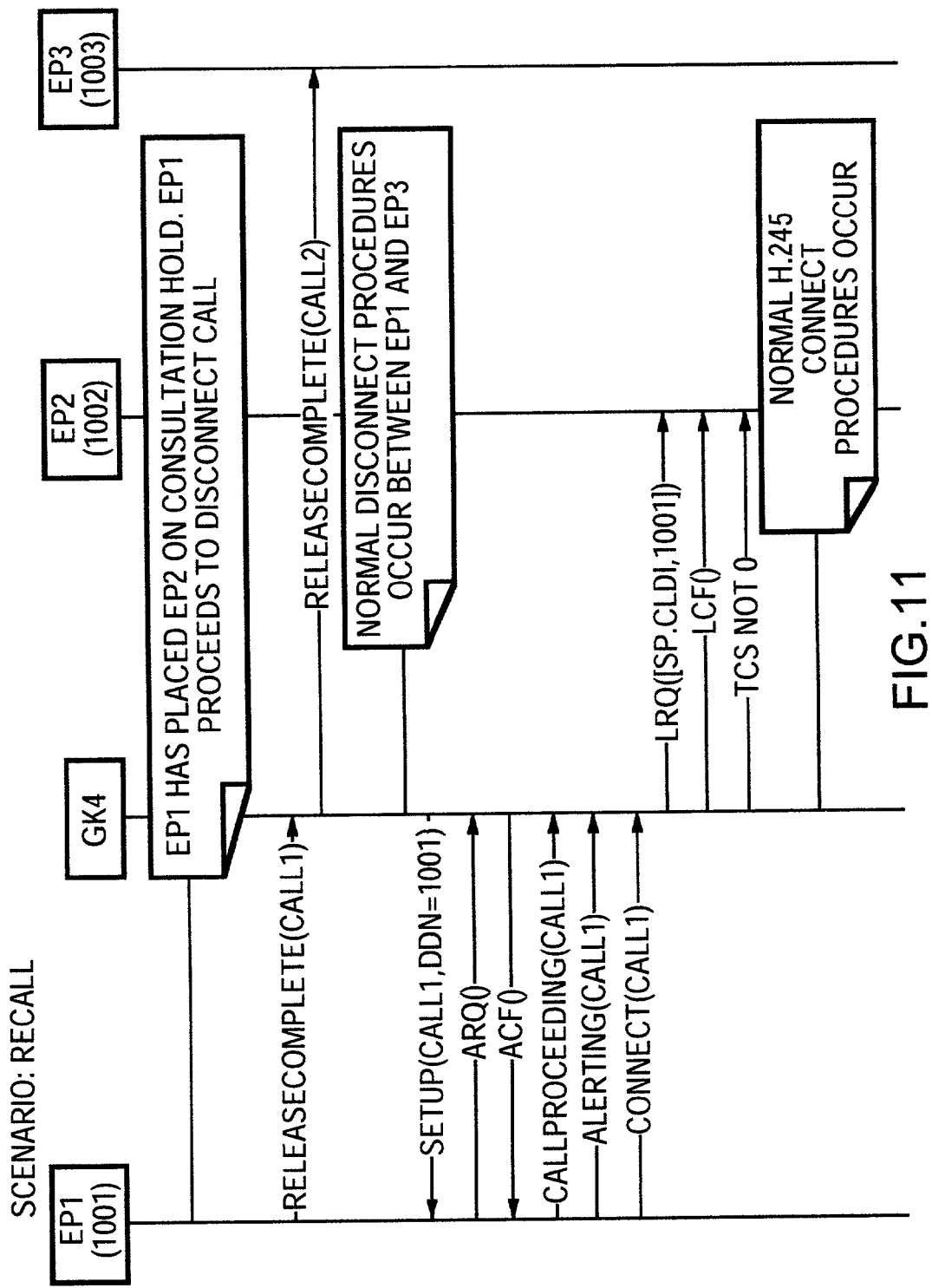
FIG. 11 shows message flow using SSSP for implementing a recall feature.

In the scenario of FIG. 11 a Recall feature is shown (Single Call Scenario).

The message sequence is as follows:
1. EP1 has EP2 on Consultation Hold. EP1 is also in a consultation call with EP3.
2. EP1 ends the call with EP3.
3. Normal disconnect procedures occur between EP1 and EP3. EP2 is still on hold.
4. The GK 4 proceeds to offer a call to EP1 after the disconnect on behalf of EP2. The CRV, CallID, and ConfID should be the same as the original call between EP1 and EP2.
5. EP1 sends back ALERTING to indicate that EP1 is ringing. However, the ALERTING message shall not be passed to EP2
6. Once the user at EP1 answers the call, EP1 sends a CONNECT message back to the GK 4. The GK 4 proceeds to remove EP2 off hold and normal H.245 connection procedures occur.

Figure 12:
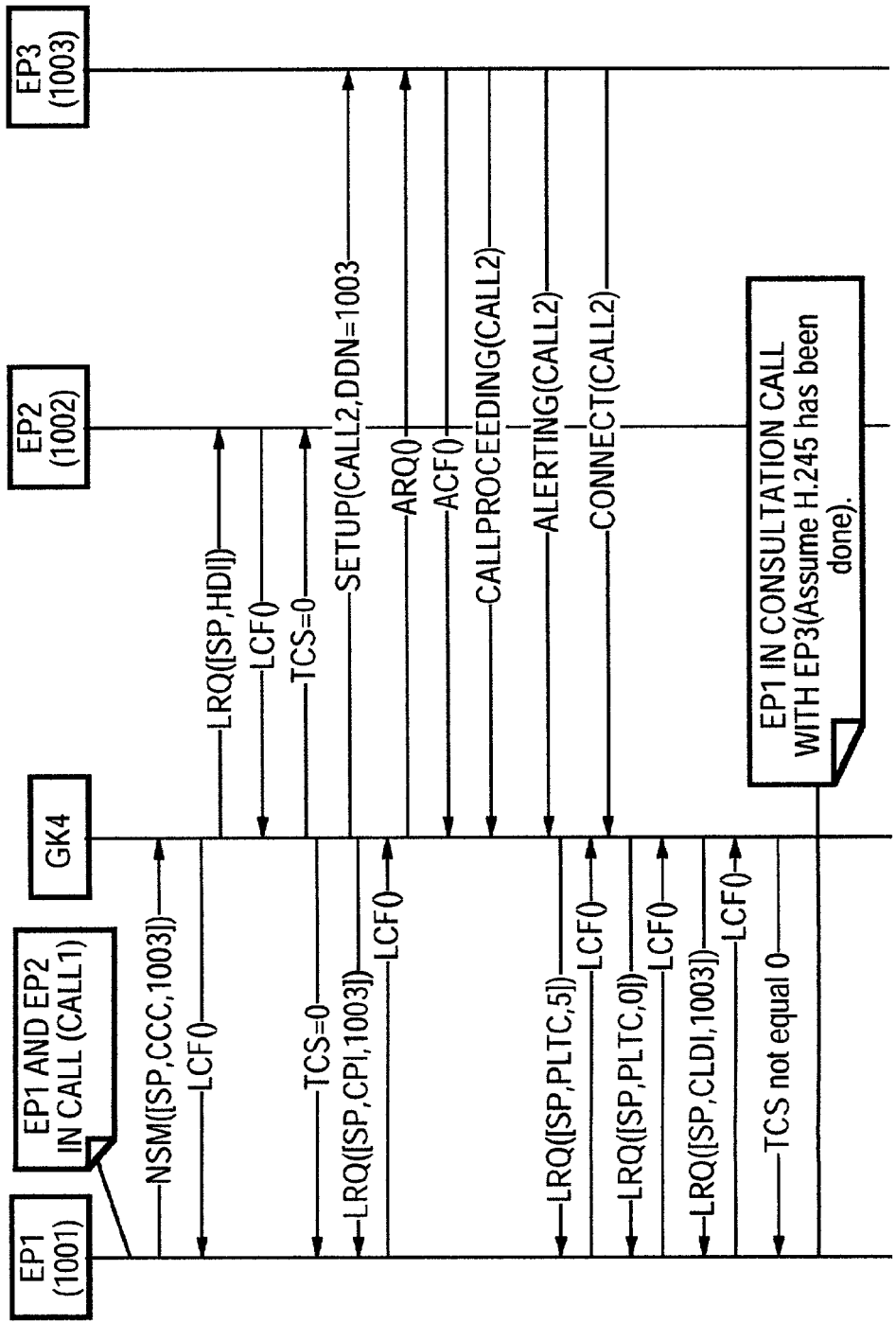
FIG. 12 shows a first portion of message flow using SSSP for implementing a call transfer with consultation.
Figure 13:
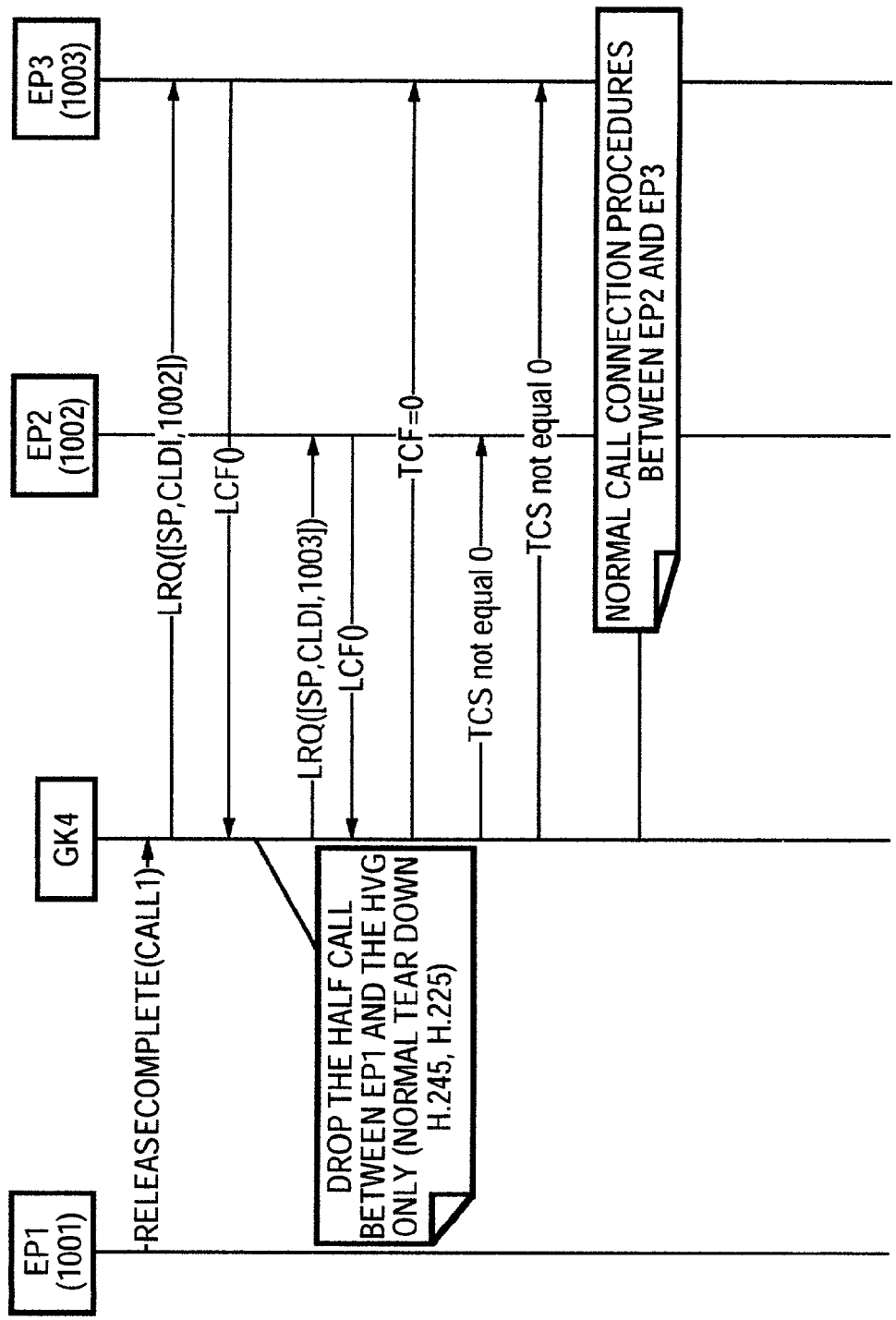
FIG. 13 shows a second portion of message flow using SSSP for implementing a call transfer with consultation.

In the scenario of FIGS. 12 and 13 Call transfer with consultation call is shown.

The message sequence is as follows:
1. Assume EP1 and EP2 are in a call (CALL1). The user at EP1 wants to transfer the user on EP2 to EP3.
2. The user at EP1 selects the TRANS/CONF option or HOLD key.
3. EP1 provides a prompt to allow the user to enter a DN. Digits in this state are not taken as DTMF requests.
4. The user at EP1 enters the DN for EP3 and presses SEND. After pressing SEND, any additional digits entered are be considered as DTMF requests by the EP.
5. EP1 sends a CONSULTATION CALL COMMAND PDU containing the DN=1003.
6. The GK 4 sends a PAUSE (TCS=0) command to both EP1 and EP2. EP2 receives a HOLD INDICATION SSSP PDU prior to the PAUSE message. EP2 should provide some form of visual indication to inform the user at EP2 that he/she has been put on hold.

7. The GK 4 places a new call to EP3. EP3 should have a different CRV and Call ID than EP1, and the same Conference ID as EP1. Once the SETUP message is sent to EP3 from the GK 4, the GK 4 will send a CALL PROGRESS INDICATION PDU containing DN=1003 back to EP1. EP1 should provide visual indication to the user that a call is proceeding with EP3 who's DN is 1003.
8. Once EP3 is ringing (ALERTING), the GK 4 instructs EP1 to play local ringing through a PLAY TONE COMMAND SSSP PDU. Assume that a ToneNumber of 5 represents local ringing.
9. Once EP3 answers the consultation call, the GK 4 disables local ringing by sending a PLAY TONE COMMAND SSSP PDU with a ToneNumber of 0. In addition, the GK 4 will send a CALLING LINE IDENTIFIER SSSP PDU to EP1. EP1 should display the default talk state display at this point.
10. The GK 4 sends a RESUME (TCS not 0) message to EP1 and normal H.245 call procedures occur between EP1 and EP3.
11. The user at EP1 completes the call transfer by releasing the call. EP1 sends a RELEASE COMPLETE to the GK 4. The GK 4 proxies the disconnect so only the leg between the GK 4 and EP1 is dropped.
12. The GK 4 sends a CALLING LINE IDENTIFIER INDICATION SSSP PDU (containing the DN of EP2) to EP3 and a CALLING LINE IDENTIFIER INDICATION SSSP PDU (containing the DN of EP3) to EP2. EP2 and EP3 should display their default talk state display.
13. The GK 4 pauses EP3 with a PAUSE message
14. The GK 4 sends a RESUME message to both EP2 and EP3, and normal H.245 call procedures occur.

Figure 14:
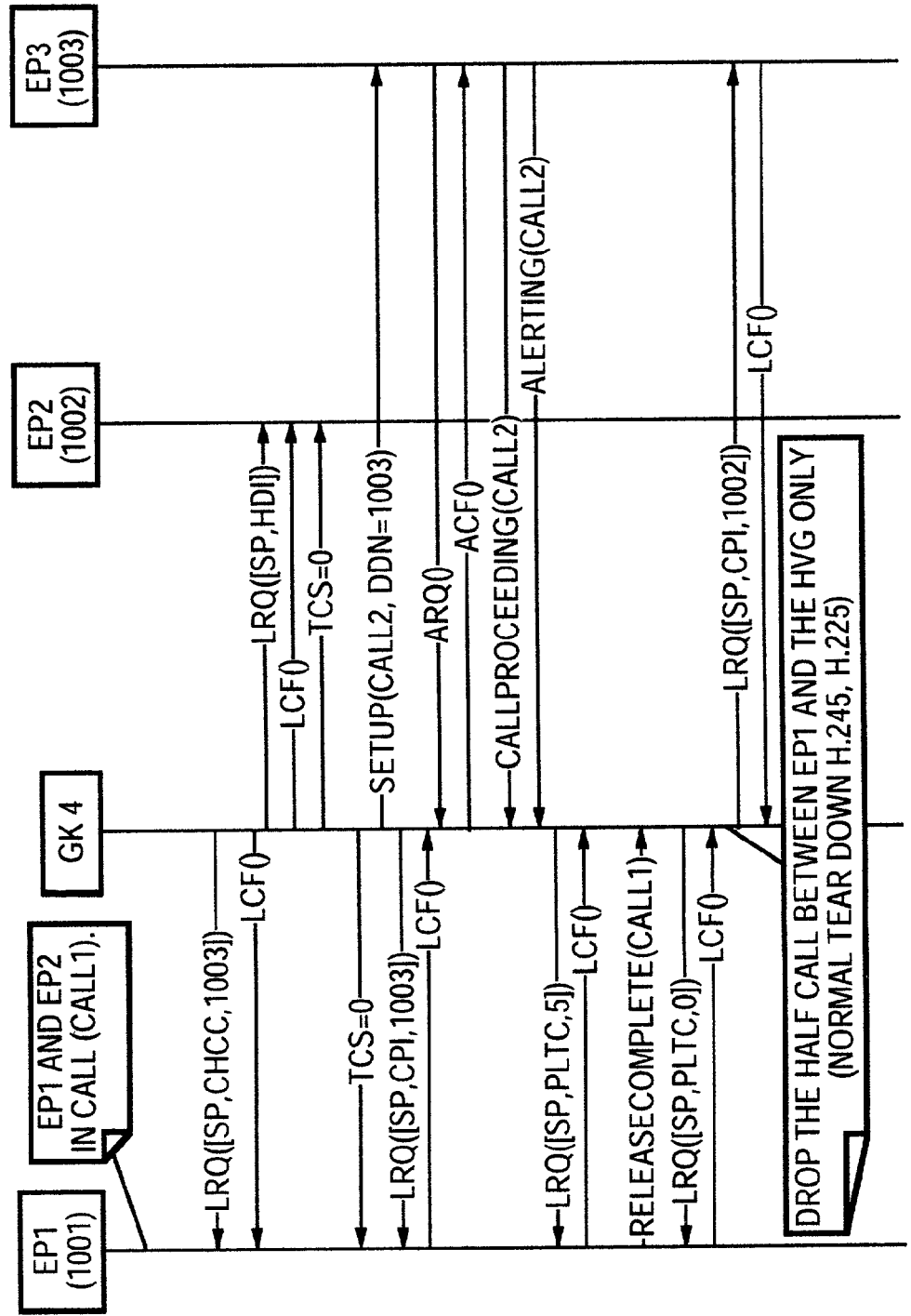
FIG. 14 shows a first portion of message flow using SSSP for implementing a blind call transfer.
Figure 15:
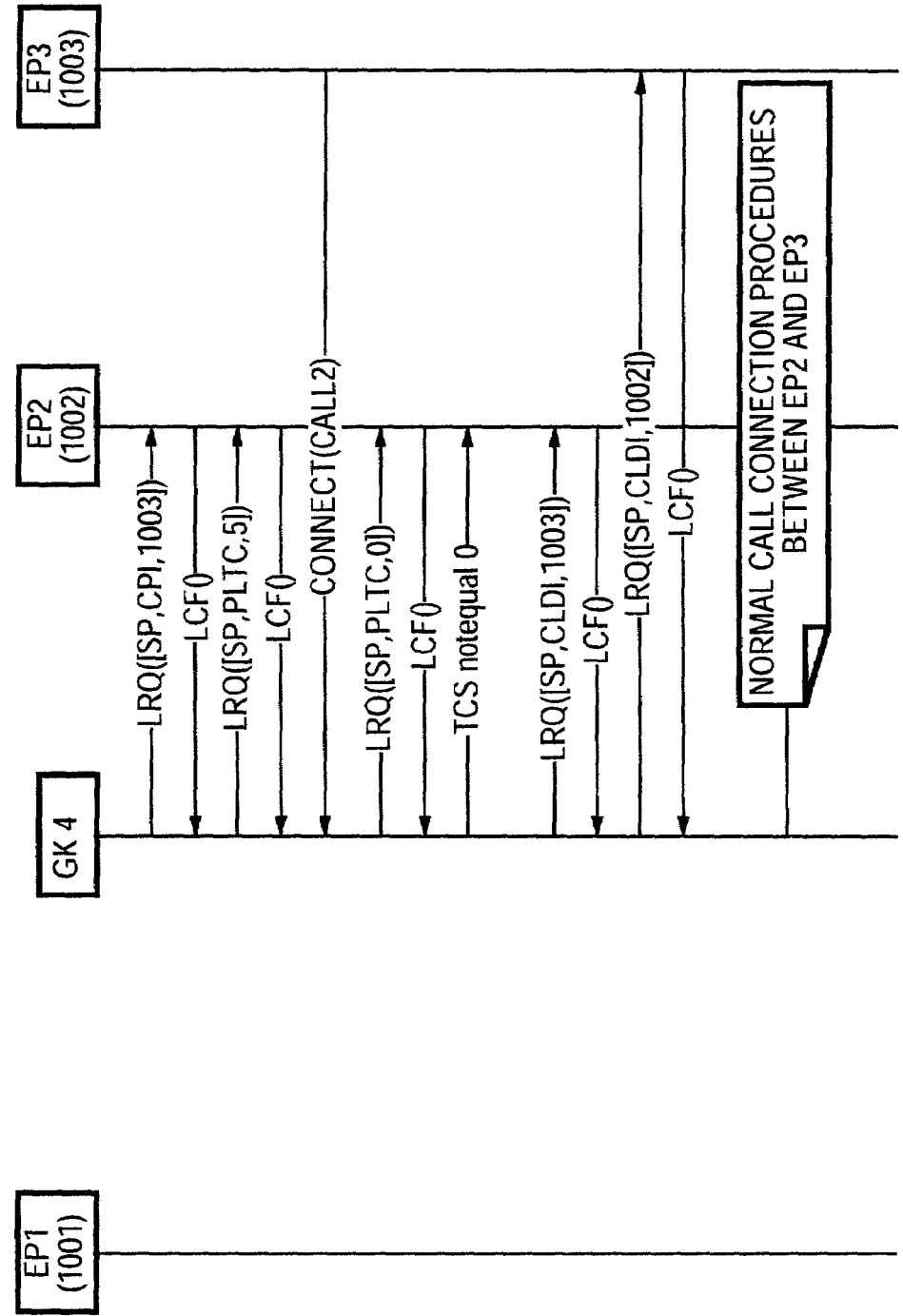
FIG. 15 shows a second portion of message flow using SSSP for implementing a blind call transfer.

In FIGS. 14 and 15 Blind transfer with consultation call is shown.

The message sequence is as follows:
1. Steps 1 to 7 from FIGS. 12 and 13 are followed.
2. Once EP3 is ringing (ALERTING), the GK 4 instructs EP1 to play local ringing through a PLAY TONE COMMAND SSSP PDU. Assume that a ToneNumber of 5 represents local ringing.
3. The user at EP1 decides to complete the call transfer at this point by hanging up the call (blind transfer). On reception of RELEASE COMPLETE, the GK 4 will send a PLAY TONE COMMAND to disable ringing. Note, the user may decide to hang-up prior to hearing local ringing to initiate the blind transfer. Basically, before EP1 receives the PLAY TONE COMMAND. If this is the case, a PLAY TONE COMMAND will not be sent to EP1 and the sequence continues with NSM(CALL2, [SP,CPI, 1002]).
4. The GK 4 sends a CALL PROGRESS INDICATION SSSP PDU (containing the DN of EP2) to EP3. EP3 should display the proper visual indication to show that a call is proceeding with EP2.
5. The GK 4 sends a CALL PROGRESS INDICATION SSSP PDU (containing the DN of EP3) to EP2. EP2 should display the proper visual indication to show that a call is proceeding with EP3. The GK 4 will also send a PLAY TONE COMMAND to EP2 so that it would play ringing tone to the user.
6. Once the user at EP3 answers the call, EP3 sends a CONNECT message to the GK 4.
7. The GK 4 instructs EP2 to stop ringing with a PLAY TONE COMMAND. The GK 4 also sends a RESUME (TCS not 0) message to EP2, and normal H.245 call procedures occur.
8. The GK 4 sends A CALLING LINE IDENTIFIER SSSP PDU to EP2 and EP3. EP2 and EP3 should display the default talk state display at this point.

Figure 16:
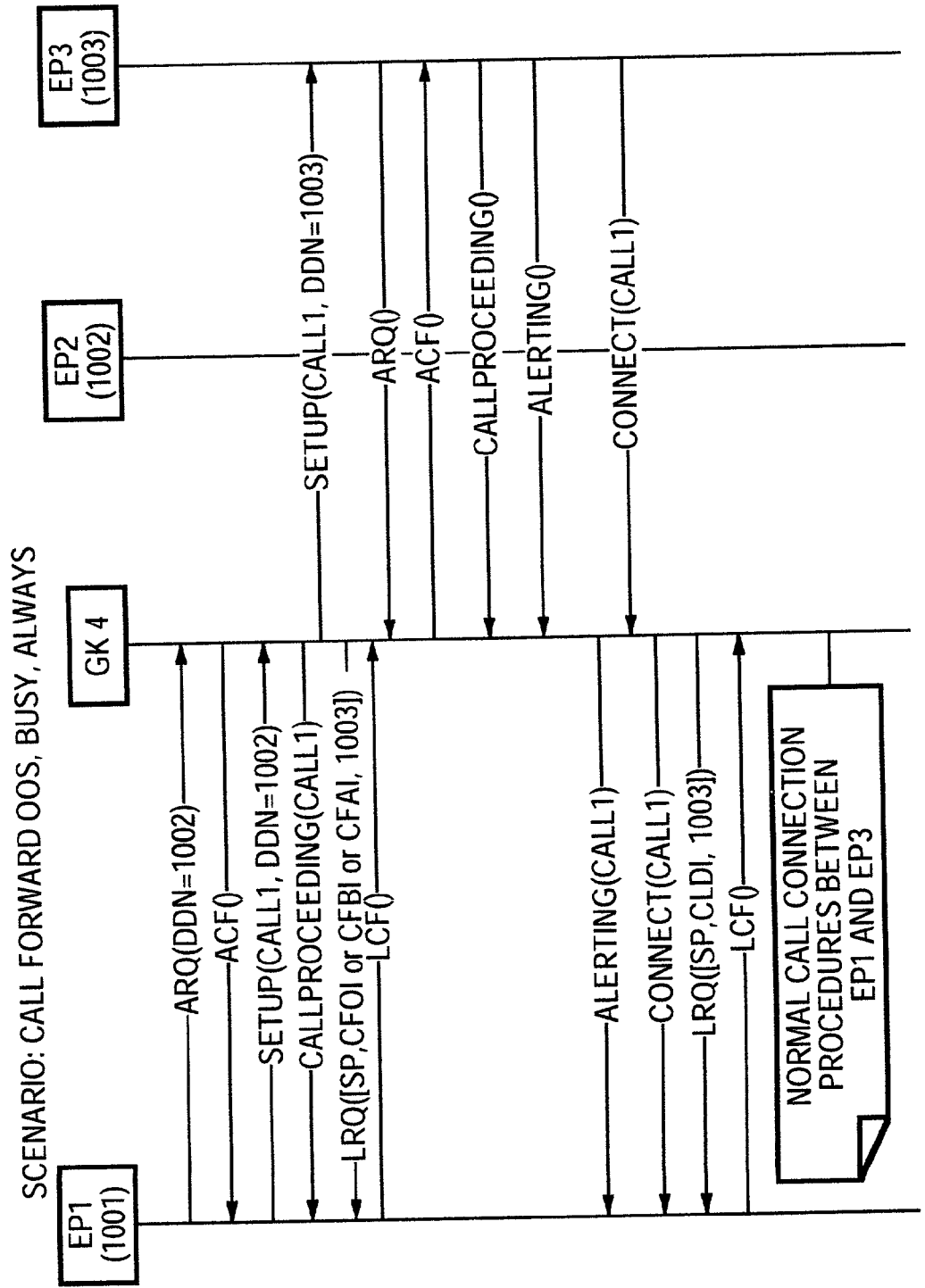
FIG. 16 shows message flow using SSSP for implementing a call forward out of service, busy, always feature.

In the scenario of FIG. 16 Call Forward Out of Service, Busy, or Always is shown.

The message sequence is as follows:
1. The user at EP1 wants to make a call to EP2 and proceeds with normal call operations
2. EP2 is either Out of Service, Busy, or has Call Forward Always activated. Assume the call forwarding destination is set to EP3
3. The GK 4 re-routes the call to EP3 and normal call procedures between EP1 and EP3 occur with the following exception. Once the SETUP message is sent to EP3, the GK 4 will send either a CALL FORWARD OUT OF SERVICE INDICATION (CFOI), CALL FORWARD BUSY INDICATION (CFBI), or CALL FORWARD ALWAYS INDICATION (CFAI) SSSP PDU to EP1 in a NSM. The message sent depends on state at EP2. EP2 should have a different CRV than EP1, and the same Call ID and conference ID as EP1. EP1 should provide the correct visual indication stating the type of call forwarding that has occurred and to which destination the call has been forwarded to.
4. Once the user at EP3 answers the call, a CONNECT message is sent by EP3 to EP1 through the GK 4. At this point, normal H.245 procedures occur. In addition, the GK 4 sends a CALLING LINE IDENTIFIER INDICATION SSSP PDU to EP1. EP1 should display its default talk state display at this point.

Figure 17:
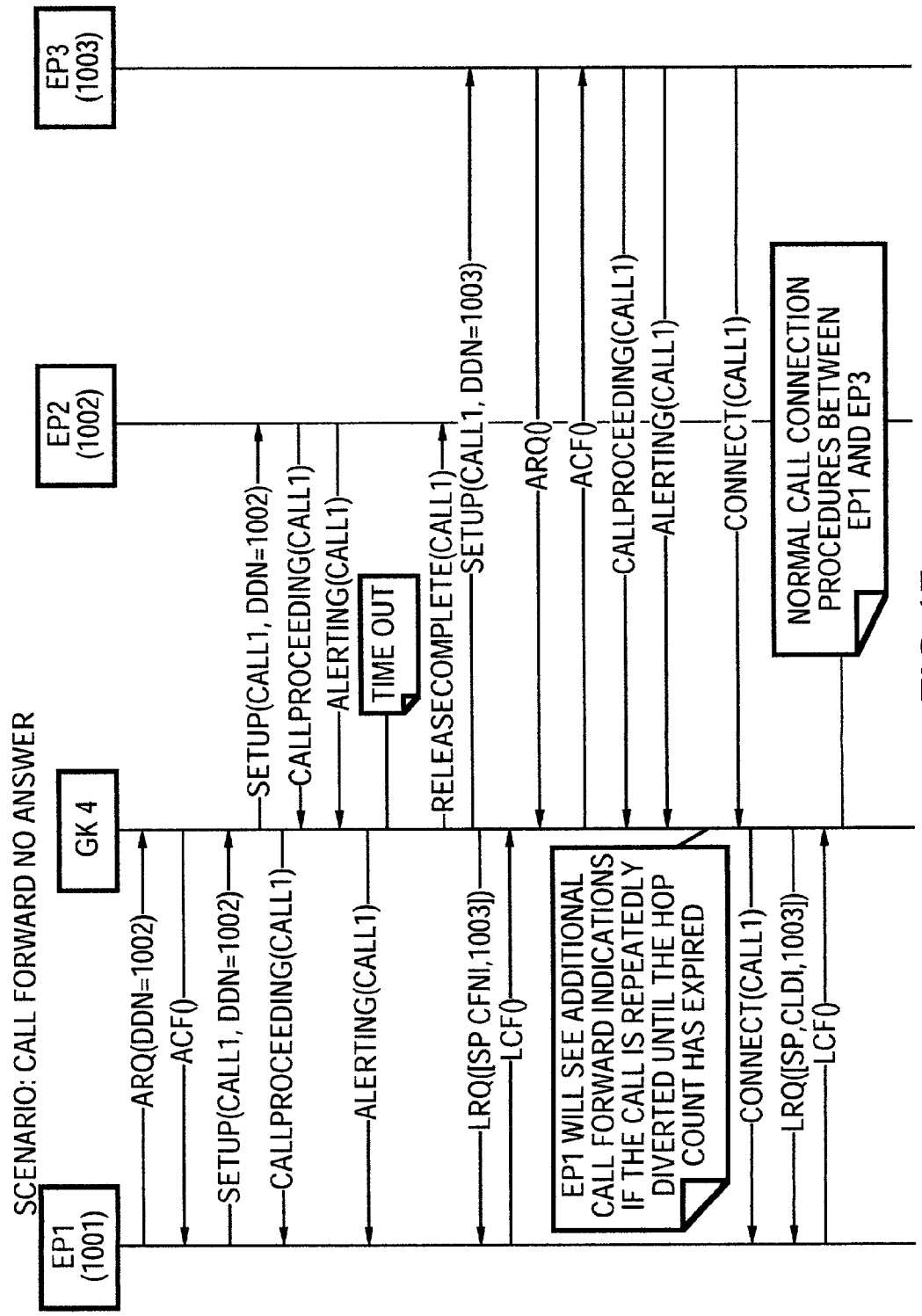
FIG. 17 shows message flow using SSSP for implementing a call forward no answer feature.

In the scenario of FIG. 17 Call Forward No Answer is shown.

The message sequence is as follows:
1. The user at EP1 wants to make a call to EP2 and proceeds with normal call operations
2. No user is available to answer the call at EP2 and the ring timer in the GK 4 expires. Assume Call Forward No Answer is set for EP2 with a forwarding destination of EP3. The GK 4 proceeds to release the half call with EP2.
3. The GK 4 makes a new call with EP3. Once the SETUP message is sent to EP3, the GK 4 will send a CALL FORWARD NO ANSWER INDICATION with the DN of EP3 to EP1. Assume EP1 is still ringing. EP2 should have a different CRV than EP1, and the same Call ID and conference ID as EP1. EP1 should provide the correct visual indication stating the type of call forwarding that has occurred and to which destination the call has been forwarded to.
4. Normal call operations between EP1 and EP3 occur once EP3 sends a CONNECT message to the GK 4. EP1 should display its default talk state display when the CALLING LINE IDENTIFIER INDICATION is received by the Endpoint.

Figure 18:
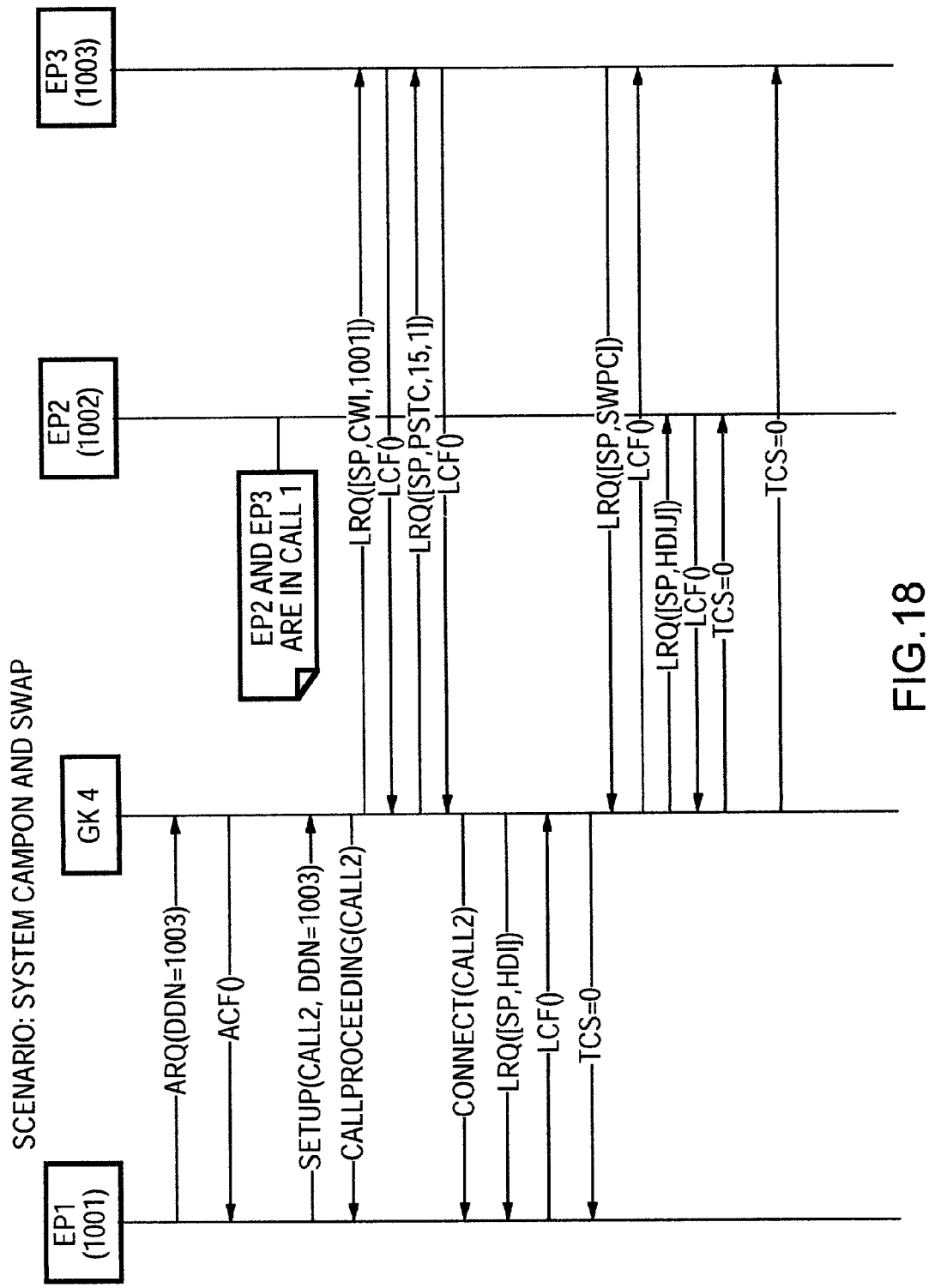
FIG. 18 shows a first portion of message flow using SSSP for implementing a system camp-on and swap.
Figure 19:
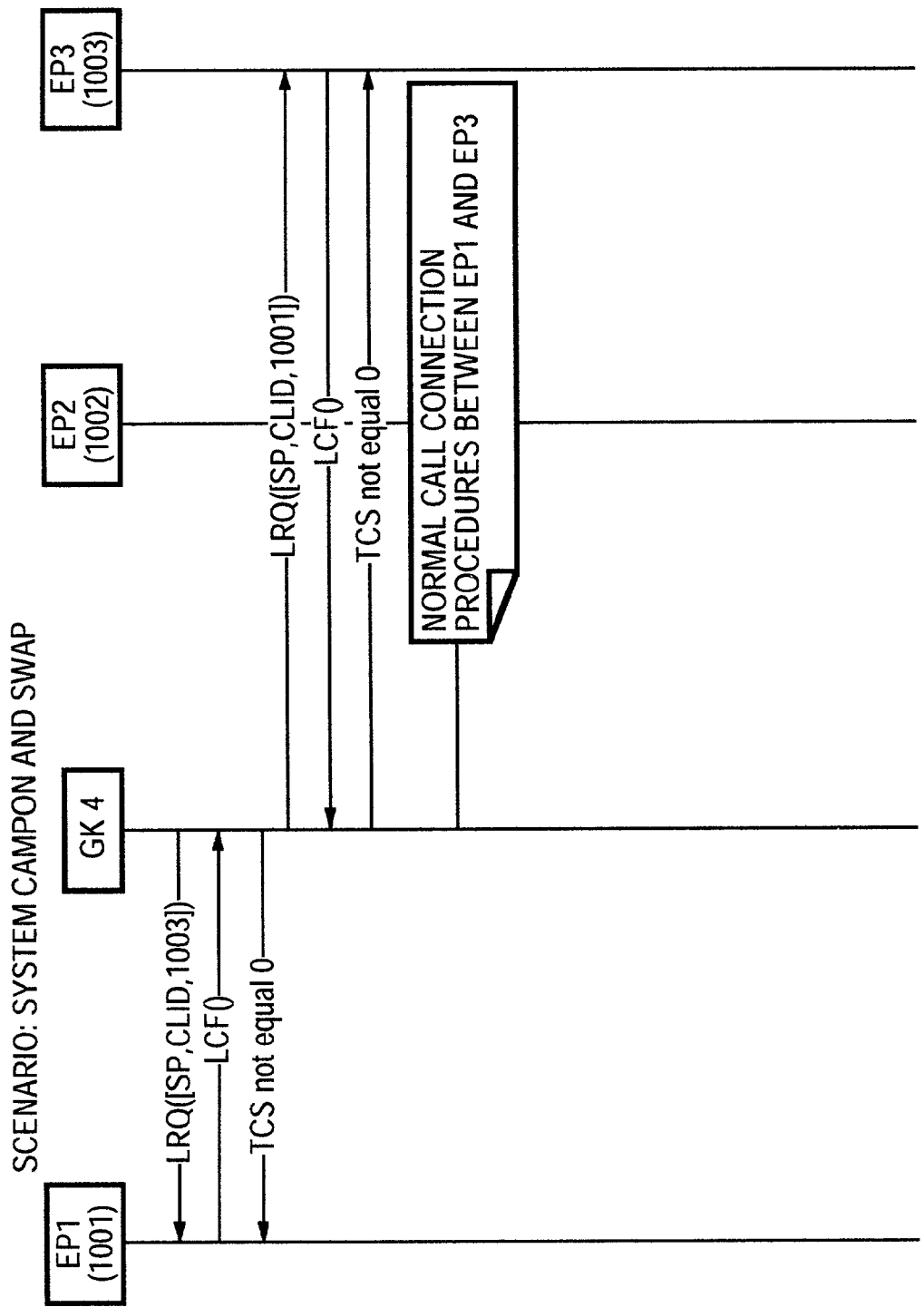
FIG. 19 shows a second portion of message flow using SSSP for implementing a system camp-on and swap.

In the scenario of FIGS. 18 and 19 System Camp-on and Swap is shown.

The message sequence is as follows:
1. EP2 and EP3 are in a call.
2. The user at EP1 proceeds to make a new call to EP3. Note the CRV, Call ID, and Conference ID used by EP1 is different than the one used for the call between EP2 and EP3.
3. Assume system camp-on is enabled for the user of EP1. The GK 4 determines EP3 is busy and sends a CALL WAITING INDICATION SSSP PDU (with the DirectoryNumber Parameter=1001) to EP3. EP3 should provide some form visual indication indicating a camped on call to the user. The GK 4 will also instruct EP3 to play a short tone to provide audio indication to the user.
4. The GK 4 sends a CONNECT message to EP1 and proceeds to PAUSE the call initiated by EP1. A HOLD INDICATION is sent to EP1 from the GK 4 and a PAUSE (TCS=0) message. EP1 should provide some form of visual indication to indicate that EP3 has been placed on hold by the system.
5. The user at EP3 decides to swap the current call to EP1 by selecting the swap feature option.
6. EP3 sends a SWAP COMMAND SSSP PDU to the GK 4. The GK 4 proceeds to place EP2 on hold by sending a HOLD INDICATION SSSP PDU and a PAUSE message. EP2 should provide some form of visual indication to the user that they have been placed on hold.
7. The GK 4 sends a PAUSE message to EP3
8. The GK 4 sends a CALLING LINE IDENTIFIER INDICATION to EP1. EP1 should provide its default talk state display at this point.
9. The GK 4 sends a CALLING LINE IDENTIFIER INDICATION to EP3. EP1 should provide its default talk state display at this point.
10. The GK 4 sends a RESUME (TCS not 0) to both EP1 and EP3 and normal H.245 call procedures follow.

Figure 20:
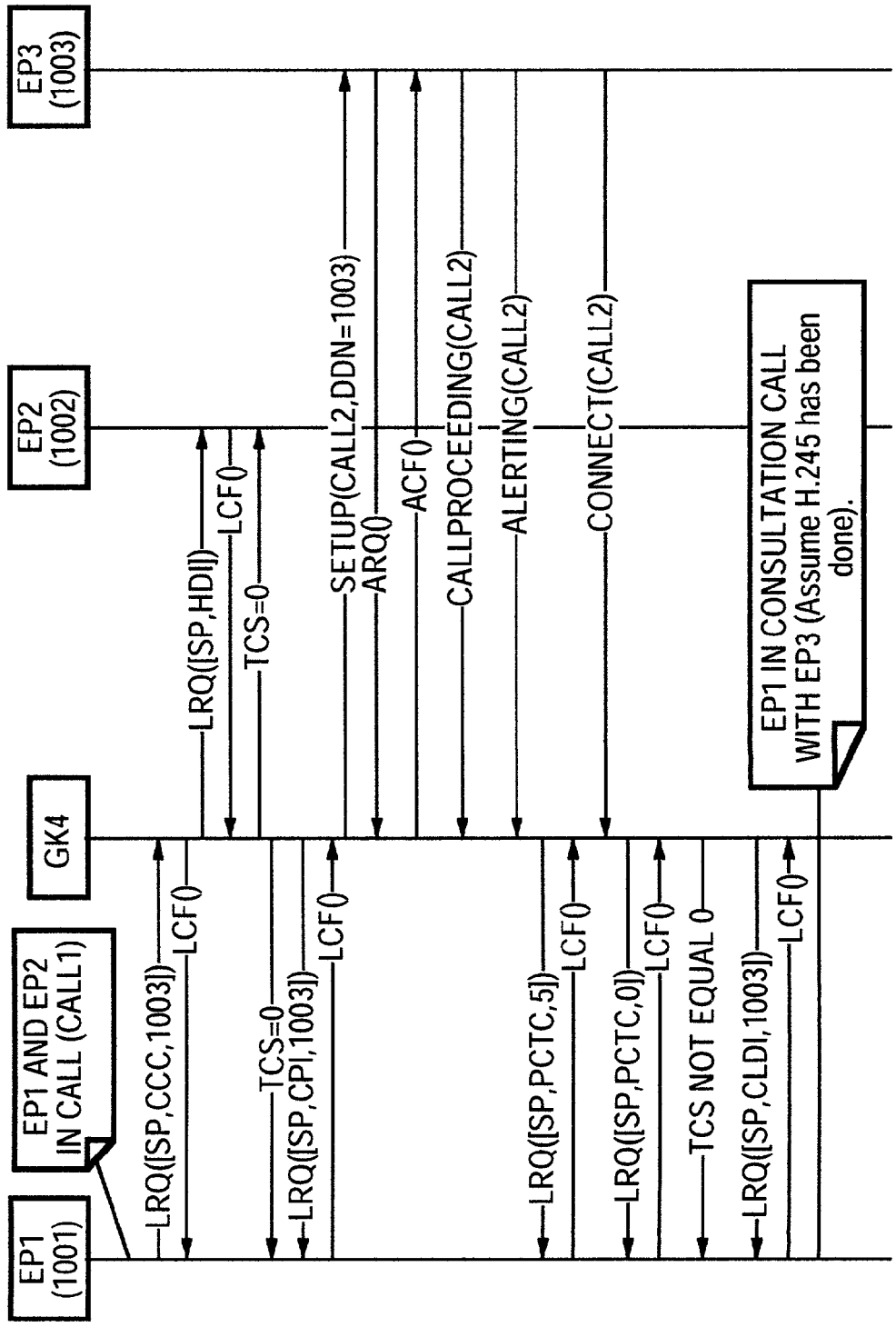
FIG. 20 shows a first portion of message flow using SSSP for implementing ad hoc conference expansion.
Figure 21:
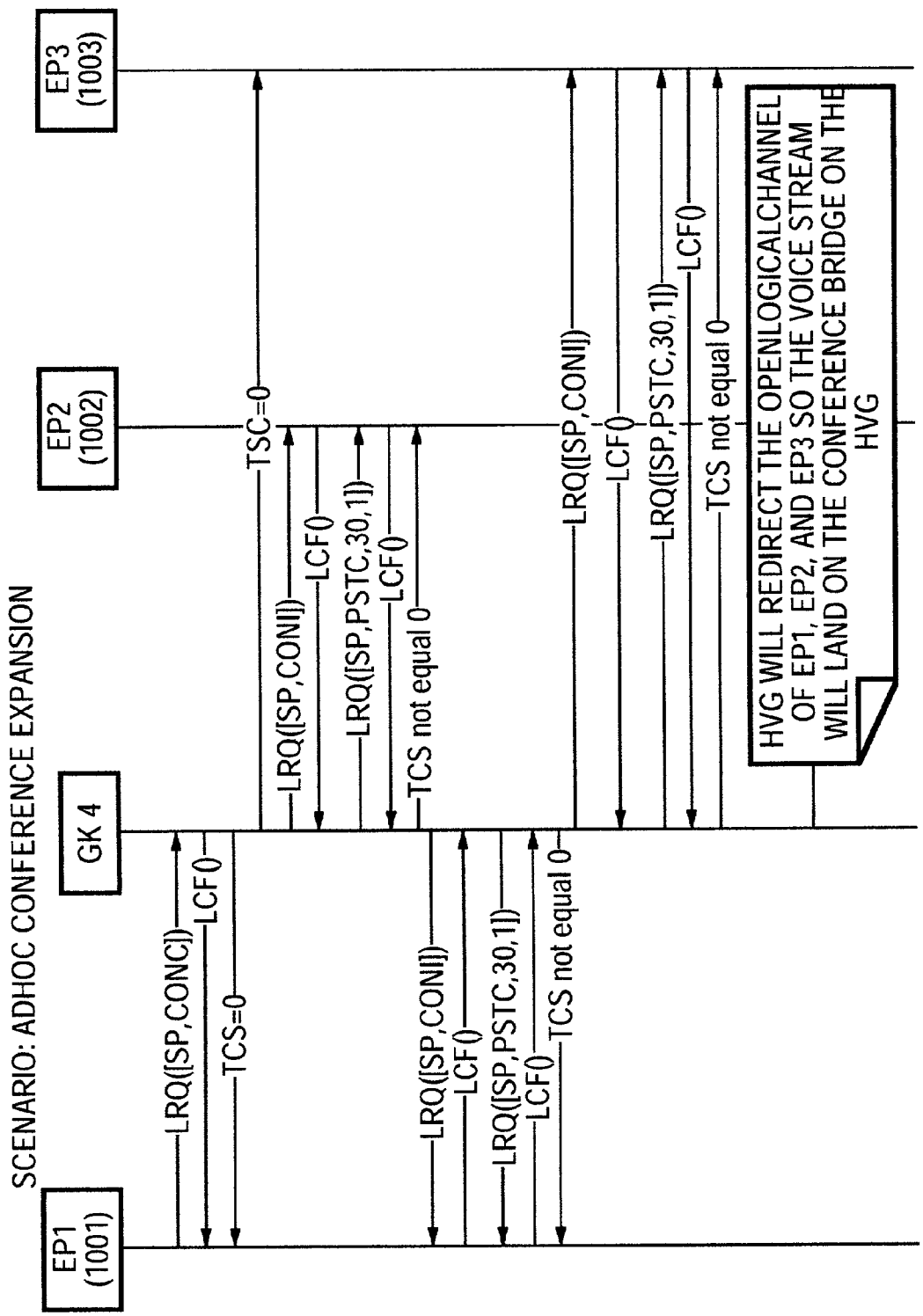
FIG. 21 shows a second portion of message flow using SSSP for implementing ad hoc conference expansion.

In the scenario of FIGS. 20 and 21 Adhoc Conference Expansion is shown.

The message sequence is as follows:
1. Steps 1 to 10 from FIGS. 12 and 13 are followed.
2. The user at EP1 completes the conference by selecting the conference feature option.
3. EP1 sends a CONFERENCE COMMAND SSSP PDU in a NSM to the GK 4.
4. The GK 4 pauses EP1 and EP3 by sending a PAUSE message to both EP1 and EP3.
5. The GK 4 sends a CONFERENCE INDICATION SSSP PDU to EP1, EP2, and EP3. Each endpoint shall provide some form of visual indication to the user to inform him/her that a conference event has occurred. The PLAY SHORT TONE COMMAND SSSP PDU is also sent to each EP after CONFERENCE INDICATION to provide each user with a comfort tone (100 ms of tone in this example).
6. The GK 4 sends a RESUME message to EP1, EP2, and EP3. The GK 4 will proxy the H.245 negotiation to move EP1, EP2, and EP3 to the conference bridge. This involves negotiating all the necessary Terminal Capability, Master Slave, and Open Logical exchanges on behalf of the conference bridge to get EP1, EP2, and EP3's RTP stream to the bridge.

Figure 22:
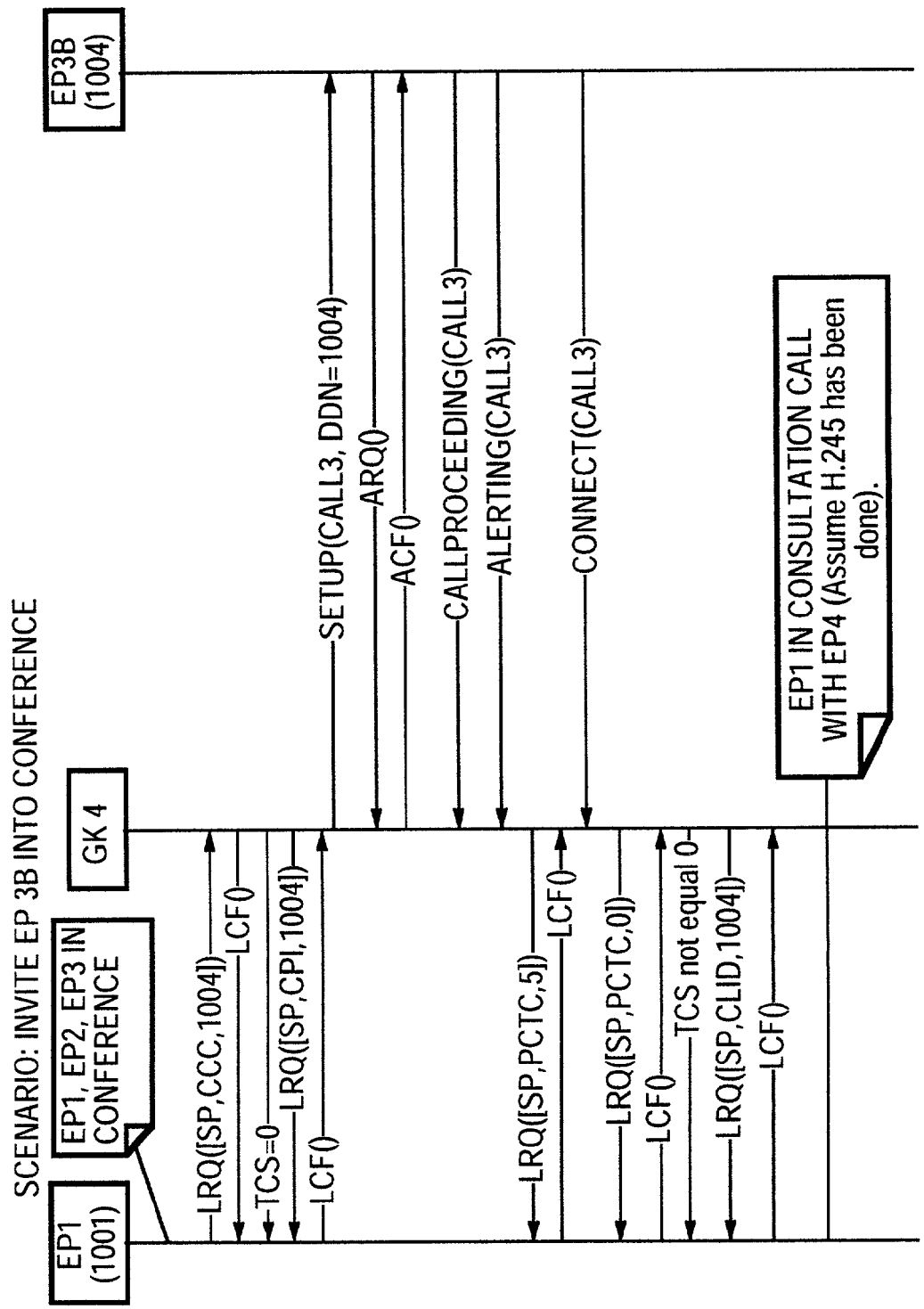
FIG. 22 shows a first portion of message flow using SSSP for implementing a conference invite.
Figure 23:
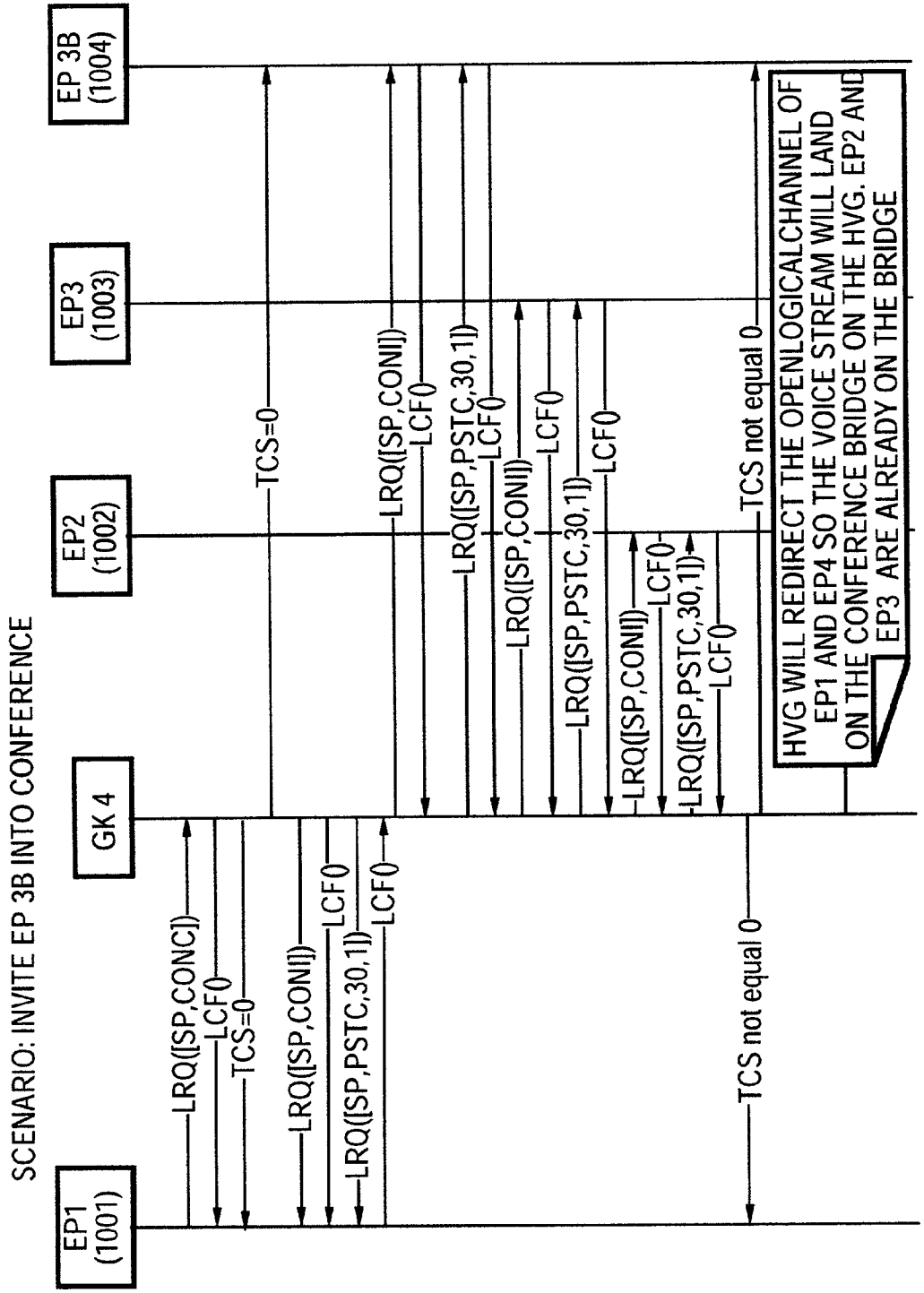
FIG. 23 shows a second portion of message flow using SSSP for implementing a conference invite.

In the scenario of FIGS. 22 and 23 Conference Invite is shown.

The message sequence is as follows:
1. Assume EP1 EP2, and EP3 are in a conference. The user at EP1 wishes to invite the user at EP3B into the conference.
2. The user at EP1 selects the consultation call option.
3. EP1 provides a prompt to allow the user to enter digits or the user can select a feature option that does not require a prompt for digits. Digits in this state are not taken as DTMF requests.
4. The user at EP1 enters the address for EP 3B. After entering the address for EP3 B, any additional digits entered shall be considered as DTMF requests.
5. EP1 sends a CONSULTATION CALL COMMAND PDU containing the DN=1003.
6. The GK 4 sends a PAUSE (TCS=0) command to both EP1.
7. The GK 4 places a new call to EP3B. EP3B should have a different CRV and Call ID than EP1's original call, and the same Conference ID as EP1. Once the SETUP message is sent to EP 3B from the GK 4, the GK 4 will send a CALL PROGRESS INDICATION PDU containing DN=1003 back to EP1. EP1 should provide visual indication to the user that a call is proceeding with EP3 who's DN is 1004.
8. Once EP 3B is ringing (ALERTING), the GK 4 instructs EP1 to play local ringing through a PLAY TONE COMMAND SSSP PDU. Assume that a ToneNumber of 5 represents local ringing.
9. Once EP 3B answers the consultation call, the GK 4 disables local ringing by sending a PLAY TONE COMMAND SSSP PDU with a ToneNumber of 0. In addition, the GK 4 will send a CALLING LINE IDENTIFIER SSSP PDU to EP1. EP1 should display the default talk state display at this point.
10. The GK 4 sends a RESUME (TCS not 0) message to EP1 and normal H.245 call procedures occur between EP1 and EP 3B.
11. The user at EP1 completes the conference invite by selecting the conference feature option.
12. EP1 sends a CONFERENCE COMMAND SSSP PDU in a H245USERINPUTINDICATION to the GK 4.
13. The GK 4 pauses EP1 and EP 3B by sending a PAUSE message to both EP1 and EP4 3B
14. The GK 4 sends a CONFERENCE INDICATION SSSP PDU to EP1, EP2, EP3, and EP 3B. Each endpoint should provide some form of visual indication to the user to inform him/her that a conference event has occurred. The PLAY SHORT TONE COMMAND SSSP PDU is also sent to each EP after CONFERENCE INDICATION to provide each user with a comfort tone (100 ms of tone in this example).
15. The GK 4 sends a RESUME message to EP1 and EP 3B. The GK 4 will proxy the H.245 negotiation to move EP1 and EP 3B to the conference bridge.

Figure 24:
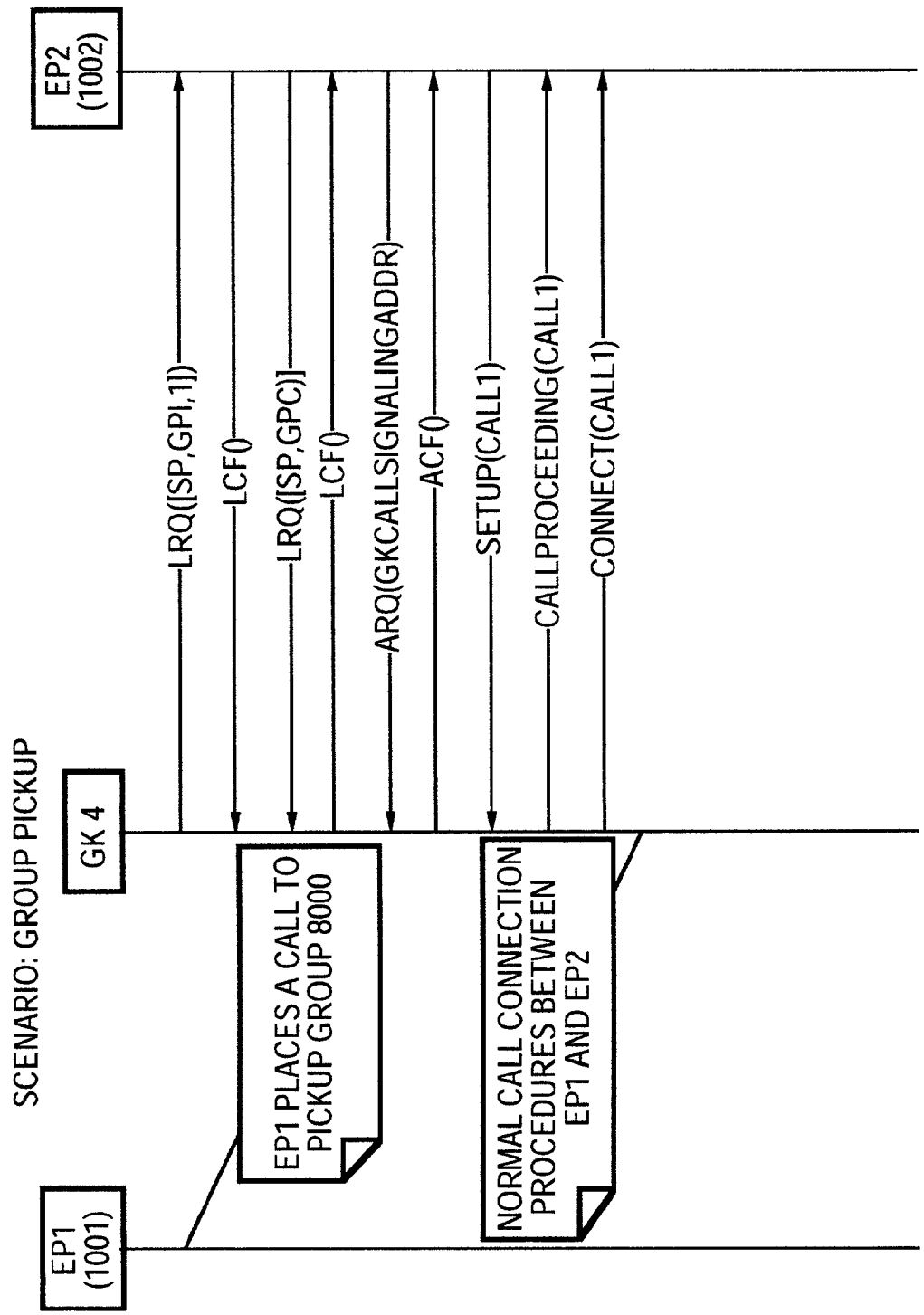
FIG. 24 shows message flow using SSSP for implementing a group pickup feature.
Figure 25:
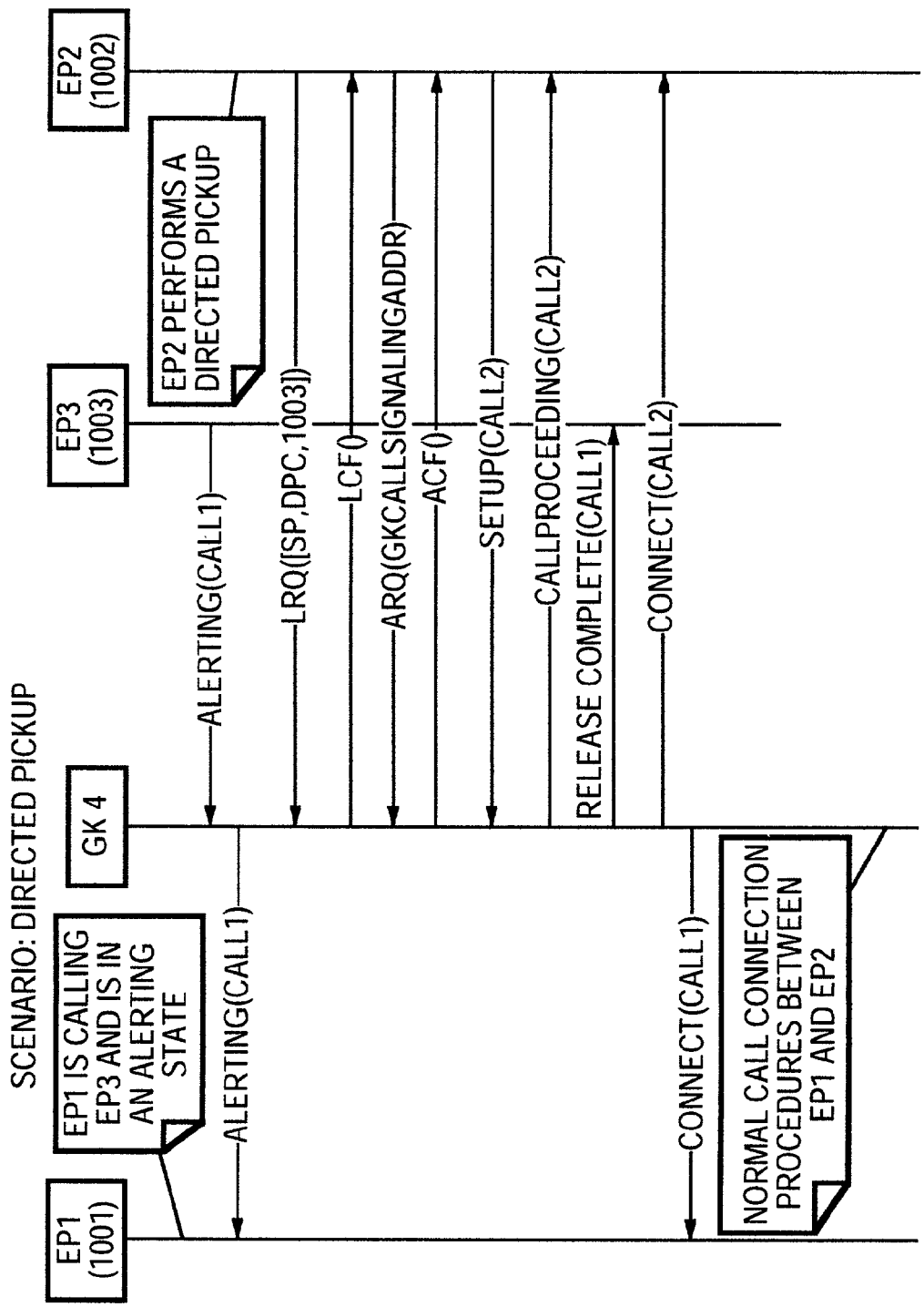
FIG. 25 shows message flow using SSSP for implementing a directed pickup feature.

In the scenario of FIG. 24 a Group Pickup feature is shown.

The message sequence is as follows:
1. EP1 calls a pickup group and assume EP1 is in the alerting state.
2. The GK 4 informs EP2 that a group pickup is available by sending it a GROUP PICKUP INDICATION SSSP PDU. EP2 should provide visual indication to the user at EP2 of an available group pickup.
3. The user at EP2 wishes to perform a group pickup and selects the directed pickup feature option at EP2.
4. EP2 proceeds to initiate a call:
   Send a GROUP PICKUP COMMAND SSSP PDU to the GK 4
   The ARQ shall contain all mandatory parameters. In addition, the message shall not contain a destination alias. The message shall contain the GK 4 call signaling address as the destination call signaling address.
   The SETUP message sent shall contain all mandatory parameters. The message shall not contain any source or destination addressing.
   The CRV, Call ID, and Conference ID should be different than that for EP1.
5. The GK 4 sends a CONNECT message to EP2 and EP1.
6. Normal H.245 call procedures between EP1 and EP2
   In the scenario of FIG. 25 a Directed Pickup feature is shown.

The message sequence is as follows:
1. EP1 calls EP3 and both EP1 and EP3 are in the alerting state.
2. The user at EP2 wishes to perform a directed pickup and selects the directed pickup feature option at EP2 and then enters the pickup code.
3. EP2 proceeds to initiate a call:
   Send a DIRECTED PICKUP COMMAND SSSP PDU containing the pickup code (6500) as a parameter.
   The ARQ shall contain all mandatory parameters. In addition, the message shall not contain a destination alias. The message shall contain the GK 4 call signaling address as the destination call signaling address.
   The SETUP message sent shall contain all mandatory parameters. The message shall not contain any source or destination addressing.
   The CRV, Call ID, and Conference ID should be different than that for EP1.
4. The GK 4 releases the half call between EP2.
5. The GK 4 sends a CONNECT message to EP2 and EP1.
6. Normal H.245 call procedures between EP1 and EP2.

Figure 26:
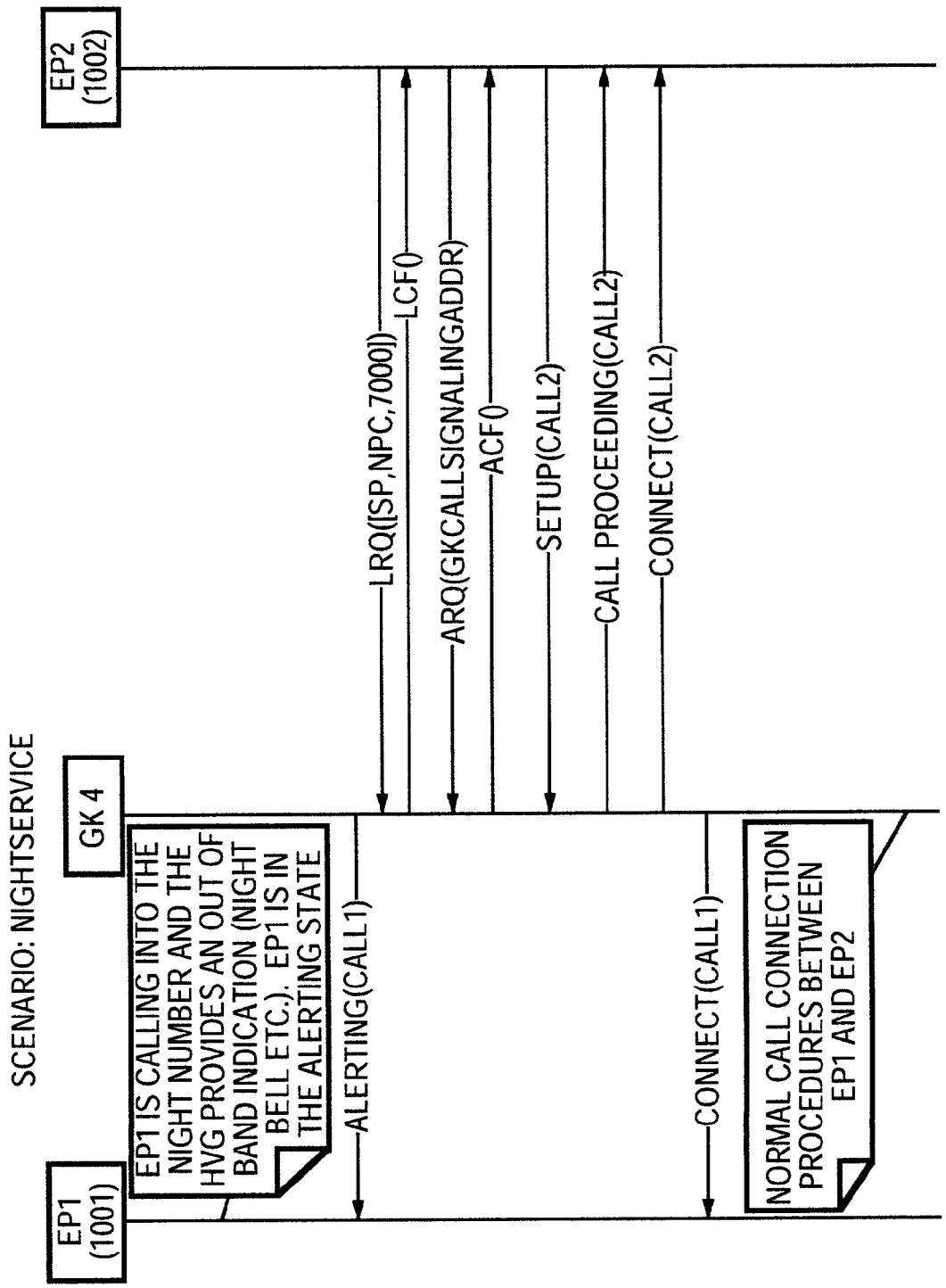
FIG. 26 shows message flow using SSSP for implementing a night service feature.
Figure 27:
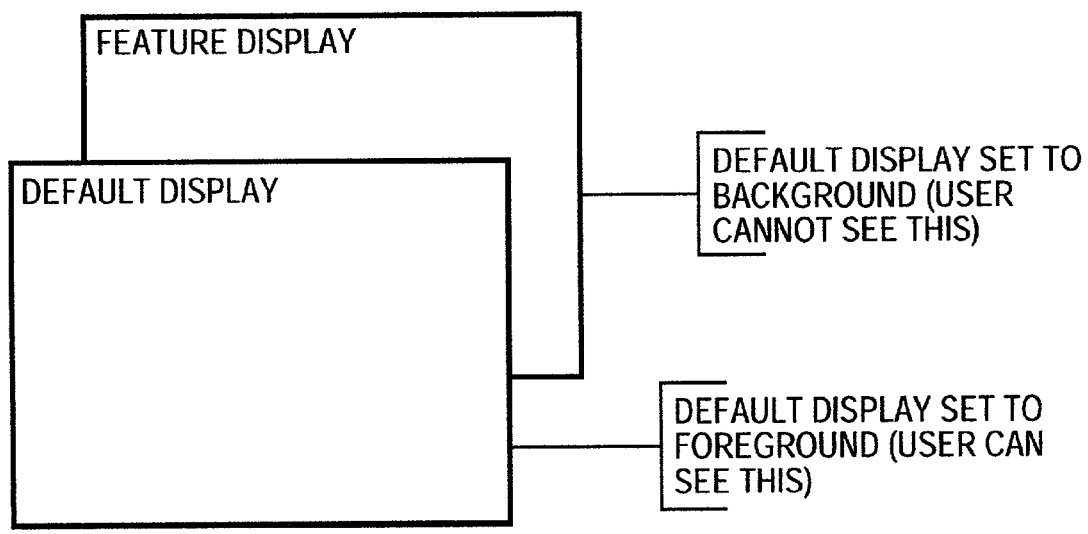
FIG. 27 is a representation of two user interface views for displaying normal call and feature information, according to a further aspect of the invention.

In the scenario of FIG. 26 a Night Service feature is shown.

The message sequence is as follows:
1. Assume Night Service is active.
2. An incoming call to the GK 4 from EP1 is in progress. EP1 is in the alerting state.
3. An out of band indication representing a night call is occurring.
4. The user at EP2 wishes to perform a night service pickup and selects the night service feature option at EP2 and then enters the night service code.
5. EP2 proceeds to initiate a call:
   Send a NIGHT SERVICE PICKUP COMMAND SSSP PDU containing the night service code (7000) as a parameter.
   The ARQ shall contain all mandatory parameters. In addition, the message shall not contain a destination alias. The message shall contain the GK 4 call signaling address as the destination call signaling address.
   The SETUP message sent shall contain all mandatory parameters. The message shall not contain any source or destination addressing.
   The CRV, Call ID, and Conference ID should be different than that for EP1.
6. The GK 4 sends a CONNECT message to EP2 and EP1.
7. Normal H.245 call procedures between EP1 and EP2.

User Interface Support for SSSP

A complicated state machine is traditionally required to keep user interfaces (UIs) in the correct context for displaying information related to a functionally based supplementary services protocol. The following portion of this disclosure provides a simplified implementation for providing a UI at an Endpoint for the purpose of display normal call and feature information related to a SSSP enabled device.

The state handling required for UI display is simplified in the present invention by dividing the display into two views: a feature display, which handles all feature related displays needed during SSSP interaction, and a default display, which handles all non-SSSP related display information. By flipping between feature and default displays according to a small finite set of rules, an Endpoint can provide an effective UI without a need for a completed state machine, as set forth below.

The term Default Display represents the normal status display view that a H.323 Terminal supports (if the Terminal has a display capability). For optimal support of SSSP feature indications, according to the present invention the H.323 Terminal supports an additional view (referred to herein as the Feature Display) for display of feature information. The Feature Display is driven by SSSP indications and has the same visual dimensions as the Default Display. According to the invention, the H.323 terminal runs both views (Default and Feature) at any given time. Both displays are updated in real time. However, only one display is placed in the foreground (displayed) to the user at any given time. Based on set rules, the Feature Display and Default Display toggle back and forth from foreground to background.

Figure 28:
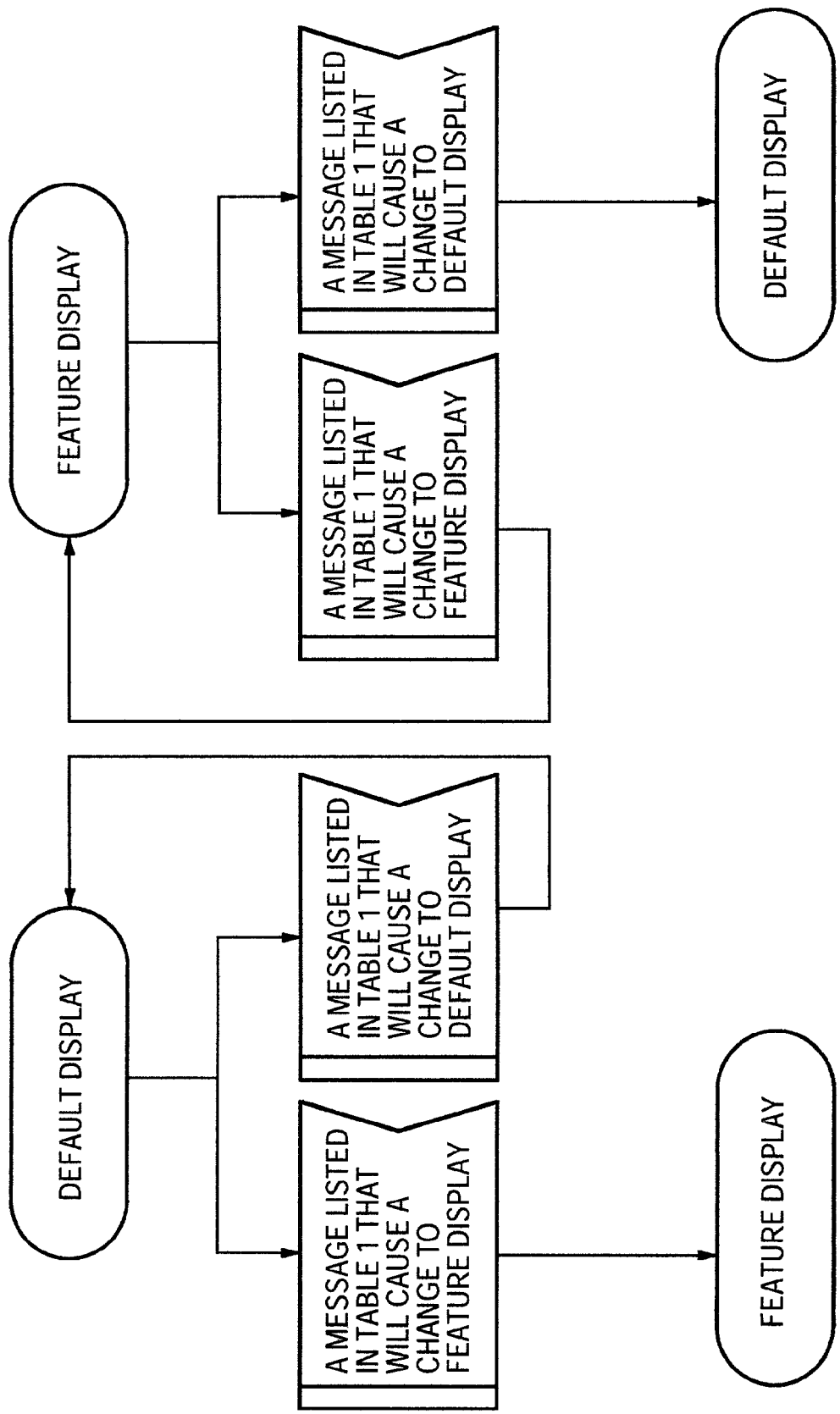
FIG. 28 is a flowchart showing implementation of a display handler for the user interface of FIG. 27.

FIG. 28, along with the information from Table 11, provides a summary of the logic required for toggling between the Default Display and Feature Display. As seen in FIG. 28, there is a specific set of messages and events that cause the Default or Feature display to be placed into the foreground. The Feature Display is placed in the foreground on reception of specific SSSP indications listed in the table. The Default display is only placed in the foreground under a condition where the user ends the call, or on reception of a CALLING LINE IDENTIFIER INDICATION SSSP message.

TABLE 11

Messaging that Changes Feature and Default Display.

| Message | Back to Feature Display | Back to Default Display |
| --- | --- | --- |
| CPI,DirectoryNumber | Terminal displays:<br>Line1: Call Proceeding<br>Line2: {DirectoryNumber} on the display | Drop call, CLDI. |
| HLDI | Terminal displays:<br>Line 1: ON HOLD | Drop call, CLDI |
| CFBI,DirectoryNumber | The Terminal can optionally display:<br>Line1: CF- Busy<br>Line2: {Directory Number} | Drop call, CLDI |
| CFOI,DirectoryNumber | The Terminal can optionally display:<br>Line1: CF- Out of Service<br>Line2: {Directory Number} | Drop call, CLDI |
| CFAI,DirectoryNumber | The Terminal can optionally display:<br>Line1: CF- Always<br>Line2: {Directory Number} | Drop call, CLDI |
| CFNI,DirectoryNumber | The Terminal can optionally display:<br>Line1: CF- No Answer<br>Line2: {Directory Number} | Drop call, CLDI |
| CONI | The Terminal will display:<br>Line1: In Conference | Drop call, CLDI |
| CWI,DirectoryNumber | The Terminal will display:<br>Line1: Call Waiting<br>Line2: {Directory Number} | Drop call, CLDI |
| ERRI,ErrorNumber | The display text will be dependent on the ErrorNumber.<br>By default the Terminal will display:<br>Line1: Error - {Error#}<br>Where {Error#} is the value of ErrorNumber.<br>For ErrorNumber 1 (Conference_Unknown_Error), the Terminal will display:<br>Line1: Conference<br>Line2: Operation Failed | Drop call, CLDI |

The contents of the display shown in Table 11 is for example purposes only. The display text may be customized to the capability of the end device. In addition, the terms "line1:" and "line2:" represent the line location to display the text on the Terminal.

Figure 29:
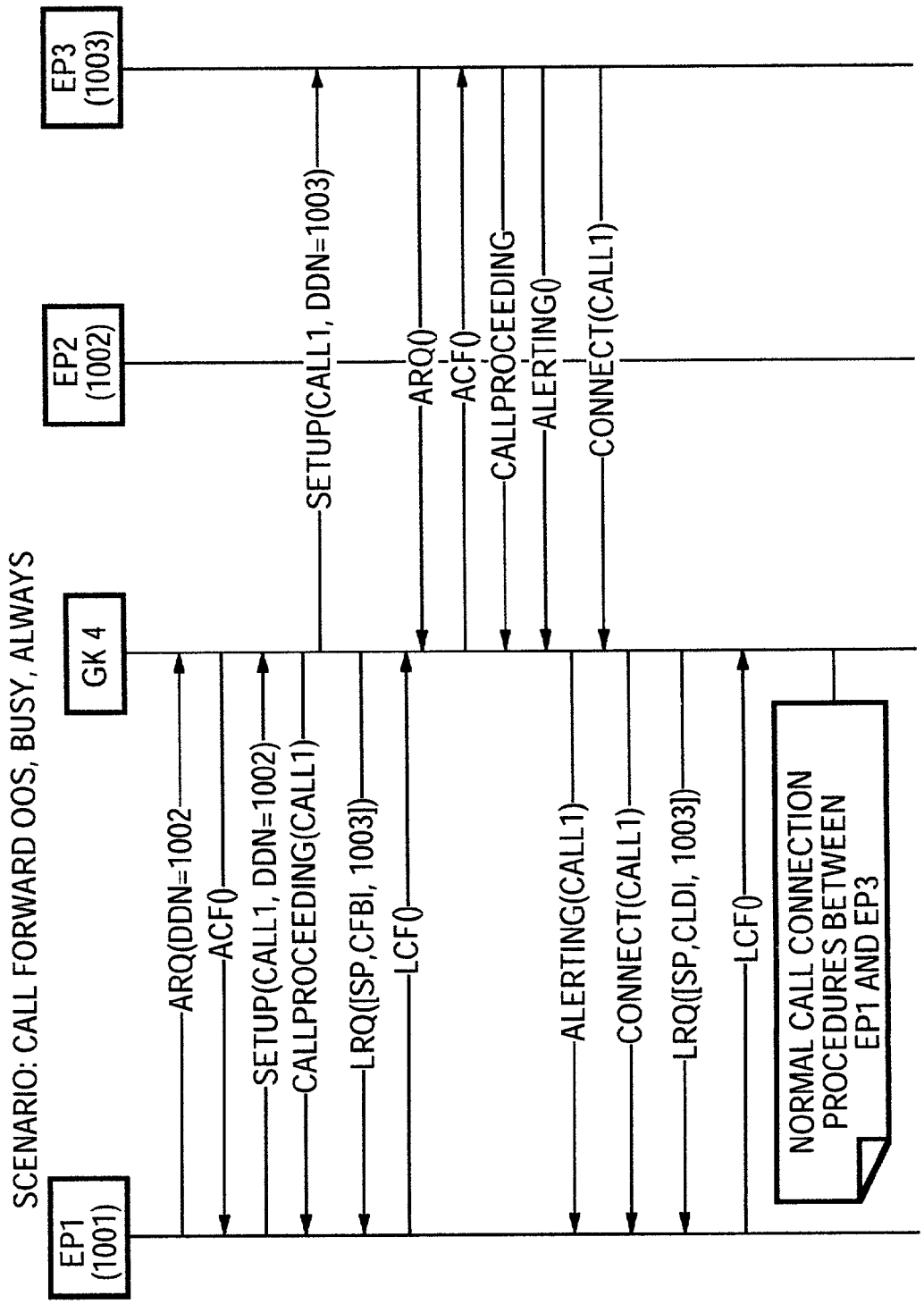
FIG. 29 shows a message flow using SSSP for implementing a call forward busy indication.

FIG. 29 illustrates how the principles discussed above provide an effective user interface, having regard to a Call Forward message exchange which illustrates toggling between the Default Display and Feature Display.
1. Scenario starts with a user at EP1 calling a user at EP3.
2. The Default Display is in the foreground at EP1
3. The user at EP1 dials 1002 and presses send.
4. The Default Display is updated to indicate that the call is proceeding as usual
5. The GK 4 determines EP2 is busy and reroutes the call to EP3
6. The GK 4 sends CALL FORWARD BUSY INDICATION with DN 1003 to EP1
7. EP1 updates the Feature Display view with "CALL FORWARD BUSY: 1003". In addition, it sees that this is a message listed on Table 11 that will cause the Feature Display to move to the foreground. EP1 flips the Feature Display to the foreground.
8. The user at EP3 sees and incoming call and answers the call. EP3 is showing the Default Display and providing to usual basic call feedback to the user.
9. The GK 4 passes the CONNECT message to EP1
10. EP1 updates its Default Display indicating the call is connected to 1002. For example, "In Call: 1002". EP1 still believes it is talking to EP2 since it is not interpreting the CALL FORWARD BUSY INDICATION. It is simply displaying it. The Default Display is in the background so the user still sees "CALL FORWARD BUSY: 1003".
11. The GK 4 will send a CALLING LINE IDENTIFIER INDICATION (CLDI) message to EP1 after the CONNECT message
12. EP1 sees the CLDI message and updates its current called party to 1003. It then updates the Default Display to say "In Call: 1003". Since CLDI is a message that will cause the Default Display to be moved to the foreground, EP1 does so and the user sees the correct visual display. Why CLDI updates the default display will be shown in Section 0.
13. Note: Feature Display still shows "CALL FORWARD BUSY: 1003". However, it is in the background and not shown to the user.

Override of Operations from Indication Messages

When the Terminal receives a message from Table 11, it cancels any existing operation that has been started. Then the Terminal displays the correct Feature or Default display in the foreground.

For example:
1. Terminal1 is in call with Terminal2
2. The user on Terminal2 presses a key and a list appears on Terminal2's display. The user on Terminal2 is undecided on what to do and the list stays on the screen.
3. In the meantime, a HDI SSSP message is sent to Terminal2.
4. Terminal2 then cancels the list, brings the Feature Display to the foreground and displays a hold message on the Feature Display.

Indications that Affect State Value

The discussion above illustrates how SSSP indications that manipulate the Feature Display so as to toggle the Feature Display from background to foreground. The rest of the SSSP indications change internal parameter/state values, particularly if a value is set or not.

TABLE 12

Messaging Affecting State.

| Message | Change |
|---|---|
| CLDI,DirectoryNumber | Terminal updates the current party called default display with a directory number of {DirectoryNumber} |
| MWI,1 or MWI,0 | Terminal displays message waiting icon or removes the message waiting icon. This could be simply flashing the LED or have a specific icon on the display to represent message waiting |
| AGTI,1 or AGTI,0 | Terminal displays the agent icon on the display or removes the agent icon off its display |
| MBYI,1 or MBYL,0 | Terminal updates its menu item to display make busy feature is enabled or disabled |
| DNDI,1 or DNDI,0 | Terminal updates its menu item to display the Do Not Disturb feature is enabled or disabled |
| CWTI,1 or CWTI,0 | Terminal updates its menu item to display the cancel work timer feature is enabled or disabled |
| GPI,1 or GPI,0 | Terminal displays a group pickup icon on the display or removes the group pickup icon from the display |

Figure 30:
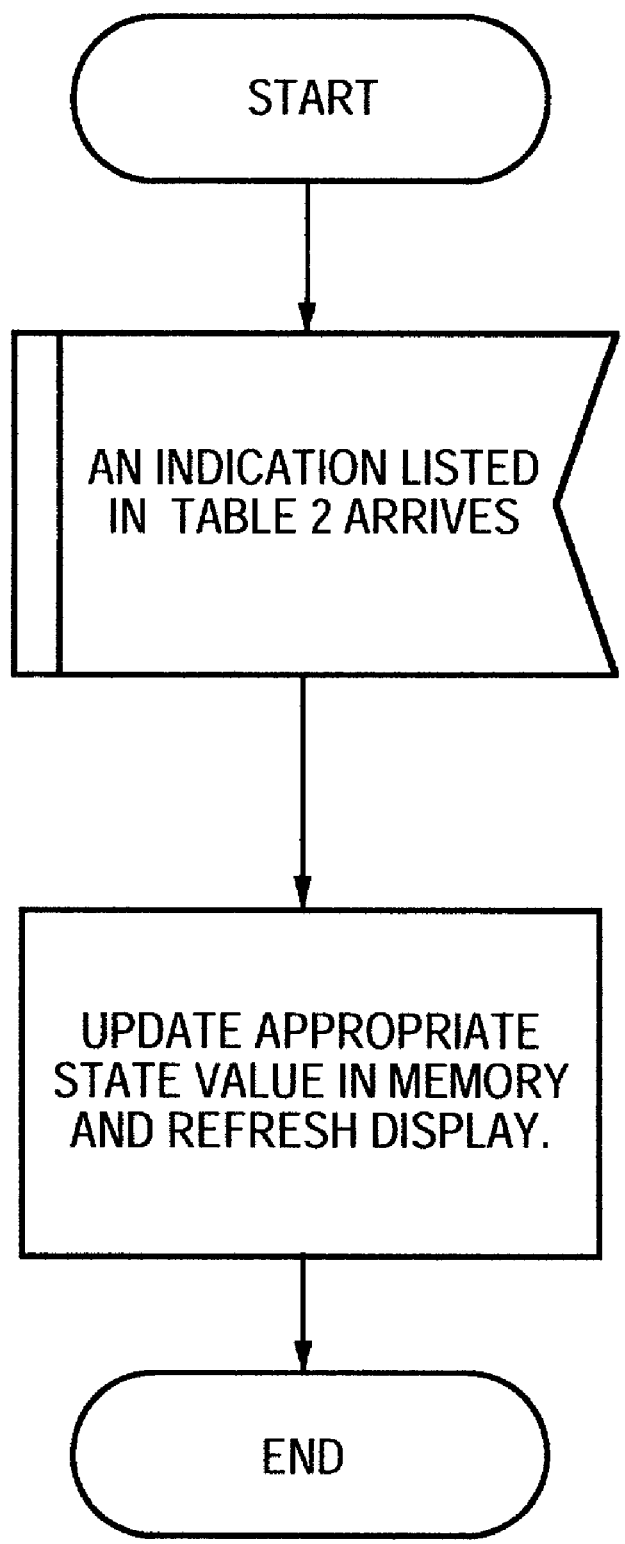
FIG. 30 is a flowchart showing implementation of a state update handler for the user interface of FIG. 27.

As shown in Table 12, the indications sent to the Endpoint cause the endpoint to update its current parameter/state value for a particular feature. This includes whether to turn on an icon or off an icon, showing if a feature is enabled or disabled in a feature list, or updating it's current calling line identifier display. On reception of a message listed in Table 12, the Endpoint follows the procedures listed in FIG. 30. Following the example discussed above with reference to FIG. 29, EP1 receives a CLDI message from the GK 4. EP1 follows the rules in Table 12 and updates its parameter that stores the calling line identifier from 1002 to 1003 refreshes the Default Display. The Default Display is still in the background. EP1 checks the rules stated by Table 11 and the Default Display is brought up to the foreground.

Alternatives and variations of the invention are possible. For example, although H.2323 protocol is set forth as the existing protocol within which SSSP is transported, the principles of SSSP may be applied to ISDN, T1 or any other user-to-user communication protocol (i.e. any protocol which supports transparent tunneling of information. Also, although the specific implementation examples are directed to exchanges between the Gatekeeper and Endpoints, it will be understood by a person of skill in the art that SSSP may also be extended to communications between Endpoints. All such alternative embodiments and variations are believed to be within the sphere and scope of the claims appended hereto.

What is claimed is:
1. A computer-implemented method of encoding a Protocol Data Unit in accordance with a Simple Supplementary Services Protocol and transmitting said Protocol Data Unit via a message formatted for network communications comprising:
    selecting between an alpha numeric string encoding for transmitting the message for voice over IP network communications and a dual tone multiple frequency string encoding for transmitting the message for dual tone multiple frequency network communications;
    providing within said Protocol Data Unit an identifier field for identifying different functionally based supplementary services;

providing within said Protocol Data Unit an end tag field for denoting message endings;

providing within said Protocol Data Unit a parameters extensions field separating said identifier field and said end tag field; and transmitting the message having a selected encoding between communications terminals.

2. The computer-implemented method according to claim 1, further comprising:

formating said message according to H.323; and encoding said Protocol Data Unit using Alpha Numeric String Encoding and transmitted within a non-standard data field of H.323 messages.

3. The computer-implemented method according to claim 1, wherein said parameter extensions field further includes a ParameterSeperator and at least one Parameter.

4. The computer-implemented method according to claim 3, wherein said ParameterSeperator in said parameter extensions field is a comma.

5. The computer-implemented method according to claim 1, wherein the selected encoding is DTMF, and a destination terminal of said communications terminals is a non-H.323 device.

6. The computer-implemented method according to claim 5, wherein said identifier field contains a Feature Tag and Feature Code.

7. The computer-implemented method according to claim 6, wherein said Feature Tag is limited to two characters for identifying said message as being DTMF String Encoded.

8. The computer-implemented method according to claim 7, wherein said Feature Code is limited to six characters for identifying different classes of said supplementary services.

9. The computer-implemented method according to claim 8, wherein said parameter extensions field further includes a ParameterSeperator and at least one Parameter.

10. The computer-implemented method according to claim 9, wherein said ParameterSeperator is an asterisk.

* * * * *